United States Patent
Schubert et al.

(10) Patent No.: US 11,515,557 B2
(45) Date of Patent: Nov. 29, 2022

(54) REDOX FLOW CELL FOR STORING ELECTRICAL ENERGY AND USE THEREOF

(71) Applicant: JenaBatteries GmbH, Jena (DE)

(72) Inventors: Ulrich Sigmar Schubert, Jena (DE); Tobias Janoschka, Jena (DE); Norbert Martin, Zwönitz OT Brünlos (DE)

(73) Assignee: JENABATTERIES GMBH, Jena (DE)

( * ) Notice: Subject to any disclaimer, the term of this patent is extended or adjusted under 35 U.S.C. 154(b) by 779 days.

(21) Appl. No.: 15/750,766

(22) PCT Filed: Aug. 3, 2016

(86) PCT No.: PCT/EP2016/001338
§ 371 (c)(1),
(2) Date: Feb. 6, 2018

(87) PCT Pub. No.: WO2017/025177
PCT Pub. Date: Feb. 16, 2017

(65) Prior Publication Data
US 2018/0241065 A1    Aug. 23, 2018

(30) Foreign Application Priority Data
Aug. 7, 2015   (DE) .......................... 102015010083.1

(51) Int. Cl.
*H01M 8/18*    (2006.01)
(52) U.S. Cl.
CPC .... *H01M 8/188* (2013.01); *H01M 2300/0002* (2013.01); *Y02E 60/50* (2013.01)
(58) Field of Classification Search
None
See application file for complete search history.

(56) References Cited

U.S. PATENT DOCUMENTS

| | | | |
|---|---|---|---|
| 4,411,761 | A | 10/1983 | Roos et al. |
| 4,771,111 | A | 9/1988 | Tieke et al. |

(Continued)

FOREIGN PATENT DOCUMENTS

| | | | |
|---|---|---|---|
| CN | 102035007 | A * | 4/2011 |
| CN | 102035007 | A | 4/2011 |

(Continued)

OTHER PUBLICATIONS

Li et al., Electrochemical and Solid-State Letters, 2011, 14(12), A171-A173. (Year: 2011).*

(Continued)

*Primary Examiner* — Zhongqing Wei
(74) *Attorney, Agent, or Firm* — Michael Ferrell; Ferrells, PLLC

(57) ABSTRACT

The redox flow cell comprises a reaction cell having two electrode chambers for catholyte and anolyte, which are each connected to at least one store for liquid and are separated by an ion-conducting membrane, and which are equipped with electrodes, wherein the electrode chambers are each filled with electrolyte solutions comprising redox-active components dissolved or dispersed in an electrolyte solvent, as well as optionally conducting salts dissolved therein and optionally further additives. The redox flow cell is characterized by the anolyte comprising a redox-active component having one to six residues of formula I in the molecule or having one to six residues of formula II in the molecule and by the catholyte comprising a redox-active component having one to six residues of formula III in the molecule or having iron salts or by the anolyte and the catholyte having a redox-active component comprising one to six residues of formula I or of formula II in combination with one to six residues of formula III in the molecule (Continued)

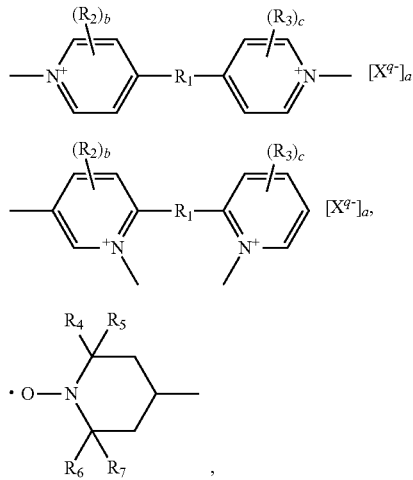

wherein $R_1$ is a covalent C—C-bond or a divalent bridge group, $R_2$ and $R_3$ independently of one another represent alkyl, alkoxy, haloalkyl, cycloalkyl, aryl, aralkyl, heterocyclyl, halogen, hydroxy, amino, nitro or cyano, X is a q-valent inorganic or organic anion, b and c independently of one another are integers from 0 to 4, q is an integer from 1 to 3, a is a number of value 2/q, and $R_4$, $R_5$, $R_6$ and $R_7$ independently of one another represent alkyl, cycloalkyl, aryl or aralkyl.

8 Claims, 6 Drawing Sheets

(56) References Cited

U.S. PATENT DOCUMENTS

| 9,793,566 | B2 | 10/2017 | Liu et al. | |
|---|---|---|---|---|
| 2011/0189549 | A1 | 8/2011 | Sun et al. | |
| 2013/0224538 | A1 | 8/2013 | Jansen | |
| 2016/0308233 | A1* | 10/2016 | Liu | H01M 8/188 |
| 2018/0331363 | A1 | 11/2018 | Winsberg et al. | |

FOREIGN PATENT DOCUMENTS

| EP | 0042984 | A1 | 1/1982 |
|---|---|---|---|
| EP | 0191726 | A2 | 8/1986 |
| EP | 0206133 | A1 | 12/1986 |
| WO | 2014026728 | A1 | 2/2014 |

OTHER PUBLICATIONS

International Preliminary Report on Patentability dated Feb. 22, 2018.
Chinese Office Action in counterpart German patent application dated Aug. 26, 2020.
Brian Huskinson et al., "A Metal-Free Organic-Inorganic Aqueous Flow Battery"; Nature, Jan. 9, 2014, pp. 195-200 and Extended Data Figures 1-9 and Table 1 (16 pp. total); vol. 505, Macmillan Publishers Limited.
B. Fang et al., "A Study of the Ce(III)/Ce(IV) Redox Couple for Redox Flow Battery Application"; Electrochimica Acta (2002) pp. 3971-3976, vol. 47, Issue 24, Elsevier Science Ltd.
Bo Yang et al., "An Inexpensive Aqueous Flow Battery for Large-Scale Electrical Energy Storage Based on Water-Soluble Organic Redox Couples"; Journal of the Electrochemical Society (2014), pp. A1371-A1380, 161 (9).
C.-H. Bae, "Chromium Redox Couples for Application to Redox Flow Batteries"; Electrochimica Acta (2002) pp. 279-287, vol. 48, Issue 3, Elsevier Science Ltd.
Tomoo Yamamura et al., "Electrochemical Investigation of Uranium ß-Diketonates for All-Uranium Redox Flow Battery"; Electrochimica Acta (2002), pp. 43-50, vol. 48, Issue 1, Elsevier Science Ltd.
Zhen Li et al., "Electrochemical Properties of an All-Organic Redox Flow Battery Using 2,2,6,6-Tetramethyl-1-Piperidinyloxy and N-Methylphthalimide"; Electrochemical and Solid State Letters (2011); pp. A171-A173, 14 (12); The Electrochemical Society.
L.W. Hruska et al., "Investigation of Factors Affecting Performance of the Iron-Redox Battery", Journal of the Electrochemical Society: Electrochemical Science and Technology; Jan. 1981, pp. 18-25, vol. 128, No. 1; The Electrochemical Society.
Fang-Qin Xue et al., "Investigation on the Electrode Process of the Mn(II)/Mn(III) Couple in Redox Flow Battery", Electrochimica Acta (2008), pp. 6636-6642, vol. 53, Issue 22, Elsevier Ltd.
Christo S. Sevov et al.: "Evolutionary Design of Low Molecular Weight Organic Anolyte Materials for Applications in Nonaqueous Redox Flow Batteries", Journal of the American Chemical Society, 2015, pp. 14465-14472, vol. 137, Nr 45, American Chemical Society.
Mohammed Harun Chakrabarti et al., "Ruthenium Based Redox Flow Battery for Solar Energy Storage" Energy Conversion and Management (2011), pp. 2501-2508, vol. 52, Issue 7, Elsevier Ltd.
Xiaoliang Wei et al., "TEMPO-Based Catholyte for High-Energy Density Nonaqueous Redox Flow Batteries", Advanced Materials (2014), pp. 1-5, vol. 26, Issue 45, Wiley-VCH Verlag GmbH & Co. KgaA, Weinheim.
Sandip Maurya et al.: "Anion exchange membrane prepared from simultaneous polymerization and quatemization of 4-vinyl pyridine for non-aqueous vanadium redox flow battery applications"; Journal of Power Sources, 2014, pp. 325-334, vol. 255, Elsevier B.V.
TEMPO-Based Catholyte for High-Energy Density Nonaqueous Redox Flow Batteries; Xiaoliang WEI et al., Advanced Materials, 2014, 26, pp. 7649-7653.
A Highly Concentrated Catholyte Based on a Solvate Ionic Liquid for Rechargeable Flow Batteries; Kensuke Takechi et al.; Advanced Materials, Mar. 10, 2015, vol. 27, Issue 15, pp. 2501-2506.
Canadian Examination Report in counterpart application dated Apr. 5, 2022.

* cited by examiner

REDOX FLOW CELL FOR STORING ELECTRICAL ENERGY AND USE THEREOF

CLAIM FOR PRIORITY

This application is a national phase application of PCT/EP2016/001338, filed 3 Aug. 2016 which was based on application DE 10 2015 010 083.1, filed 7 Aug. 2015. The priorities of PCT/EP2016/001338 and DE 10 2015 010 083.1 are hereby claimed and their disclosures incorporated herein by reference.

BACKGROUND OF THE INVENTION

The invention relates to a redox flow cell, in general language use also referred to as redox flow battery or as redox flux battery, for storage of electric energy. The redox flow cell contains two polarity specific chambers in each of which a redox-active chemical compound or a redox-active compound is present in dissolved form or dispersed in an electrolyte solvent and which are connected to liquid stores. In this way, two independent circuits are formed for the redox-active compounds dissolved, for example, in water or in an organic solvent or dispersed in an electrolyte solvent, which are separated by a membrane between the polarity-specific chambers. Ion exchange between the two chambers occurs through this membrane.

The cells are particularly suitable for stationary storage applications, for example as buffer battery for wind or solar power plants or as power and regulating reserves for load distribution in power grids, and also as mobile energy stores, for example for the operation of electric cars and electronic devices.

Redox flow batteries (RFB) are electrochemical energy stores. The compounds required for establishing the potential at the electrodes are dissolved, redox-active species which are converted in an electrochemical reactor into their other redox state during the charging or discharging process. For this purpose, the electrolyte solutions (catholyte, anolyte) are taken from a tank and are actively pumped to the electrodes. Anode space and cathode space are separated in the reactor by means of an ion-selective membrane which usually has a high selectivity for cations, preferably for protons (e.g. Nafion™). Besides this there exist also membranes, which selectively let pass negatively charged ions and which block the passage of positively charged ions. Furthermore, size-selective membranes are used (e.g. membranes for dialysis or ultrafiltration membranes), which let pass both anions and cations.

Anode and cathode chambers within the meaning of this invention are defined as follows: The cathode chamber contains the catholyte as an electrolyte and is limited by the cathode and by that membrane area which is facing the cathode. The anode chamber contains the anolyte as an electrolyte and is limited by the anode and the membrane area which is facing the anode.

At the cathode, during unloading the reduction and during loading the oxidation of the redox-active component takes place. At the anode, during unloading the oxidation and during loading the reduction of the redox-active component takes place.

Exemplary descriptions of the reactions in a redox flow cell during the charging process:
Anode

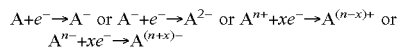

Herein A is the redox-active component and n and x can take an integer $>=1$. $e^-$ symbolizes electrons.
Cathode

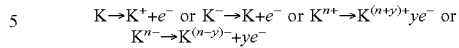

Herein K is the redox-active component and n and y can take a natural number $>=1$. $e^-$ symbolizes electrons.

The above reactions are reversed when the cell is unloaded.

As long as electrolyte solution is pumped, current can be extracted (discharging) or can be fed into the system (charging). That is the amount of energy that can be fed into a RFB is directly proportional to the size of the storage vessel. The extractable power, however, is a function of the size of the electrochemical reactor.

RFBs have a complex system technology (BoP—Balance of Plant) which corresponds approximately to that of a fuel cell. Customary construction sizes of the individual reactors are in the range from about 2 to 50 kW. The reactors can be combined very simply in a modular fashion, and the tank size can likewise be adapted virtually at will. RFBs which operate using vanadium compounds as redox pair on both sides (VRFB) are of particular importance here. This system was described for the first time in 1986 (AU 575247 B) and is at present the technical standard.

Further inorganic, low molecular weight redox pairs have been studied, including ones based on
- cerium (B. Fang, S. Iwasa, Y. Wei, T. Arai, M. Kumagai: "A study of the Ce(III)/Ce(IV) redox couple for redox flow battery application", Electrochimica Acta 47, 2002, 3971-3976)
- ruthenium (M. H. Chakrabarti, E. Pelham, L. Roberts, C. Bae, M. Saleem: "Ruthenium based redox flow battery for solar energy storage", Energy Conv. Manag. 52, 2011, 2501-2508)
- chromium (C-H. Bae, E. P. L. Roberts, R. A. W. Dryfe: "Chromium redox couples for application to redox flow batteries", Electrochimica Acta 48, 2002, 279-87)
- uranium (T. Yamamura, Y. Shiokawa, H. Yamana, H. Moriyama: "Electrochemical investigation of uranium β-diketonates for all-uranium redox flow battery", Electrochimica Acta 48, 2002, 43-50)
- manganese (F. Xue, Y. Wang, W. Hong Wang, X. Wang: "Investigation on the electrode process of the Mn(II)/Mn(III) couple in redox flow battery", Electrochimica Acta 53, 2008, 6636-6642)
- iron (L. W. Hruska, R. F. Savinell: "Investigation of Factors Affecting Performance of the Iron-Redox Battery", J. Electrochem. Soc., 128:1, 1981, 18-25).

Organic and partial organic systems in aqueous solutions also get into the focus of attention. In January 2014 the anthraquinone-disulphonic acid/bromine system has been published, that allows very high current densities, that, however, by the use of elemental bromine makes high demands to the materials of all battery components and to the security of the system. (B. Huskinson, M. P. Marshak, C. Suh, S. Er, M. R. Gerhardt, C. J. Galvin, X. Chen, A. Aspuru-Guzik, R. G. Gordon, M. J. Aziz: "A metal free organic-inorganic aqueous flow battery", Nature 505, 2014, 195-198). As fully organic systems in aqueous solution also quinones are tested (B. Yang, L. Hoober-Burkhard, F. Wang, G. K. Surya Prakash, S. R. Narayanan: "An inexpensive aqueous flow battery for large-scale electrical energy storage based on eater-doluble organic redox couples": J. Electrochem. Soc., 161 (9), 2014, A1361-A1380). The current densities meaningful applicable in the redox system are, however, limited to less than 5 mA/cm² and the maximum achievable capacity is below 10 Ah/l. The stable radical molecule 2,2,6,6-tetramethyl-1-piperidonyloxyl (TEMPO) has also been used in redox flow batteries together with N-methylphtalimide. (Z. Li, S. Li, S. Liu, K. Huang, D. Fang, F. Wang, S. Peng: "Electrochemical properties of an all-organic redox flow battery using 2,2,6,6-tetramethyl-1-piperidonyloxyl and N-methylphtalimide": Electrochemical and Solid-state Letters, 14 (12), 2011, A171-A173). Due to the resulting potentials and solubilities of the starting materials, this material system can not be readily used in an aqueous medium, but presupposes hazardous substances as solvents, such as acetonitrile. Furthermore, in this system the achievable current densities with 0.35 mA/cm² are smaller by a factor of at least 100 than for the material systems proposed in this invention. Other electrolyte systems, such as $LiPF_6$ and TEMPO (X. Wie, W. Xu, M. Vijayakumar, L. Cosimbescu, T. Liu, v. Am, W. Wang: "TEMPO-based Catholyte for high-energy density redox flow batteries" Adv. Mater. 2014 Vol. 26, 45, p 7649-7653) also require organic solvents and conducting salts, which in the event of failure can release toxic gases, such as hydrogen fluoride, thus placing high demands on system safety.

WO 2014/026728 A1 discloses redox flow cells with semi-permeable membranes, in which high molecular compounds are used as redox couple. In the example a poly(2,2,6,6-tetramethylpiperidinyloxymethacrylate-co-poly(ethyleneglycolmethyl-ethermethacrylate is used as catholyte and a poly(4,4'-bipyridine-co-poly(ethyleneglycol) is used as anolyte.

SUMMARY OF THE INVENTION

This invention is based on the object to provide a redox flow cell with selected redox-active material systems, which can be operated safely, cost-effectively and efficiently, which contains an electrolyte solution with improved pumpability, which can continue to work also with cross contamination occurring via diaphragms defects and in which an increased potential level compared to known solutions can be achieved. The redox-active components used according to the invention are characterized by a significantly reduced viscosity in comparison to the redox-active compounds known from WO 2014/026728 A1. Compared to the known polymer redox systems, the viscosity of concentrated solutions with comparable capacity (1 mol/L redox-active units) is significantly lower, so that when pumping the solutions less pressure losses occur, which results in a better energy efficiency. For example, concentrated solutions of N-dimethylviologen chloride have a viscosity of 5 mPas at room temperature, while concentrated solutions of the N-methylviologen polymer with the same capacity at room temperature have a viscosity of 20 mPas. The material systems used according to the invention are also characterized by less corrosiveness compared to an acid-based electrolyte.

This object is solved by the provision of redox flow cells with selected redox-active material systems, which can be operated without catalysts, are very well soluble in water, inexpensive and compatible with each other. The redox-active material systems can also be used as dispersions. Further details are discussed below.

BRIEF DESCRIPTION OF THE DRAWINGS

The invention is described in detail below with reference to the appended drawings. In the Figures.

DETAILED DESCRIPTION OF THE INVENTION

Figure 1:
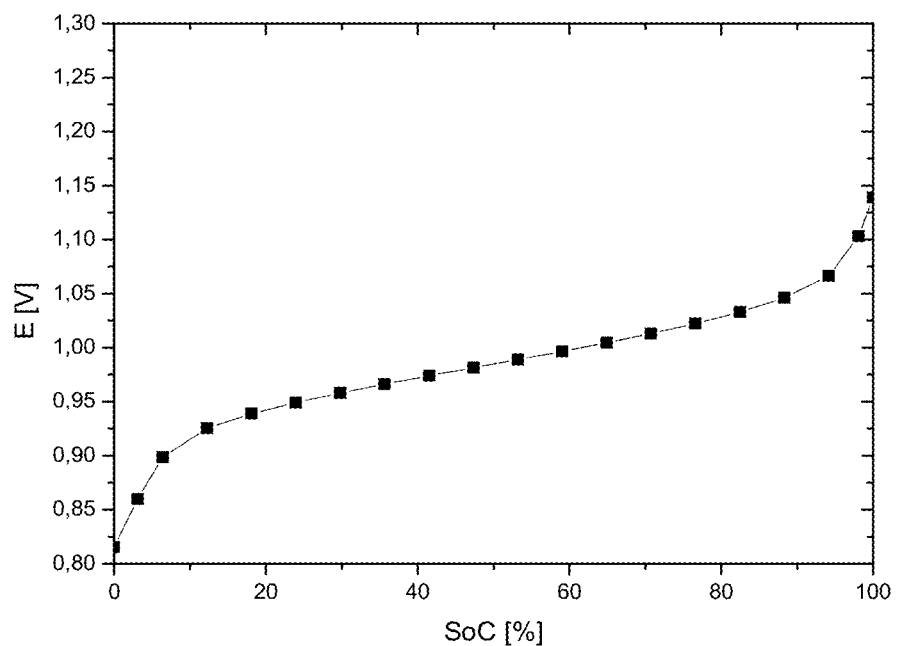
FIG. 1 is a graph of the open-circuit voltage (OCV) of a cell according to the invention as exemplified in Example 1, plotted as a function of its charge state (SOC) in percent.

The present invention relates to a redox flow cell for storage of electrical energy comprising a reaction cell having two electrode chambers for catholyte and anolyte, which are each connected to at least one store for liquid and are separated by an ion-conducting membrane, and which are equipped with electrodes, wherein the electrode chambers are each filled with electrolyte solutions comprising redox-active components dissolved or dispersed in an electrolyte solvent, as well as optionally conducting salts dissolved therein and optionally further additives. The redox flow cell of the invention is characterized by the anolyte being a redox-active component comprising one to six, preferably one to four, more preferred one to three and most preferred one to two residues of formula I in the molecule or comprising one to six, preferably one to four, more preferred one to three and most preferred one to two residues of formula II in the molecule and is characterized by the catholyte being a redox-active component comprising one to six, preferably one to four, more preferred one to three and most preferred one to two residues of formula III in the molecule or comprising iron salts or is characterized by anolyte and catholyte being a redox-active component comprising one to six, preferably one to four, more preferred one to three and most preferred one to two residues of formula I or of formula II in combination with one to six, preferably one to four, more preferred one to three and most preferred one to two residues of formula III in the molecule

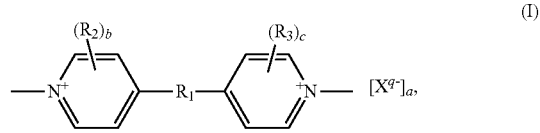

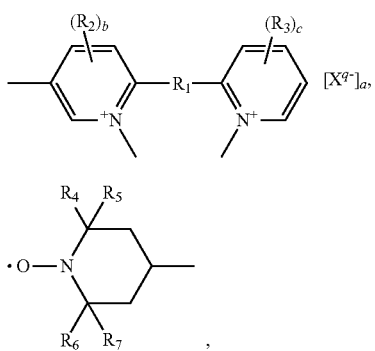

(II)

(III)

wherein the lines going off the nitrogen atoms in the structures of formulae I and II and the line going off the 4-position in the structure of formula III represent covalent bonds connecting the structures of formulae I, II and III with the remainder of the molecule, $R_1$ is a covalent C—C-bond or a divalent bridge group, preferably a covalent C—C-bond, an arylene group or a heteroarylene group, and most preferably preferred a covalent C—C-bond, a phenylene group, a biphenylene group or a thiophendiyl group, $R_2$ and $R_3$ independently of one another represent alkyl, alkoxy, haloalkyl, cycloalkyl, aryl, aralkyl, heterocyclyl, halogen, hydroxy, amino, nitro or cyano, X is a q-valent inorganic or organic anion or a mixture of such anions, b and c independently of one another are integers from 0 to 4, preferably 0, 1 or 2, q is an integer from 1 to 3, a is a number of value 2/q, and $R_4$, $R_5$, $R_6$ and $R_7$ independently of one another represent alkyl, cycloalkyl, aryl or aralkyl, preferably $C_1$-$C_6$-alkyl and most preferably ethyl or methyl.

Redox-active components preferably used in the anolyte comprise on to four residues of formula Ia and/or of formula IIa in the molecule

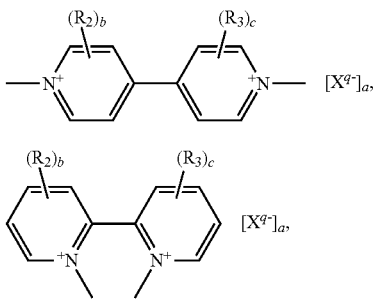

wherein the lines going off the nitrogen atoms in the structures of formulae Ia and IIa represent covalent bonds connecting the structures of formulae Ia and IIa with the remainder of the molecule, and $R_2$, $R_3$, X, a, b, c and q have the meaning as defined above.

Redox-active components preferably used in the anolyte are compounds of formulae Ib, IIb, IV, V, VII, VIIa, VIIb VIII, VIIIa, VIIIb, IX, IXa, IXb, X, Xa, Xb, XI, XIa, XIb, XII, XIIa and XIIb

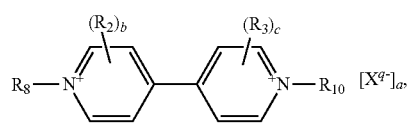

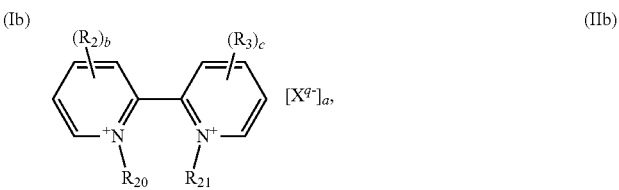

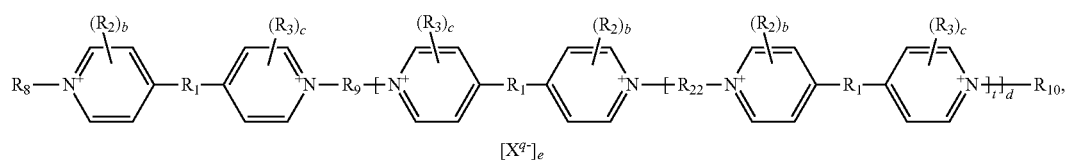

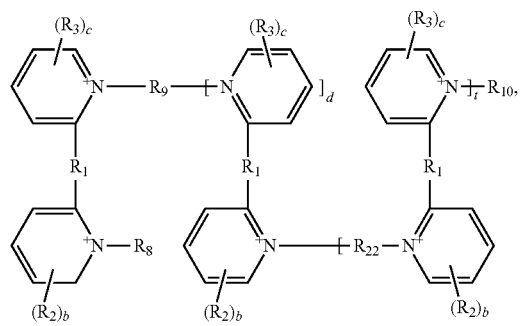

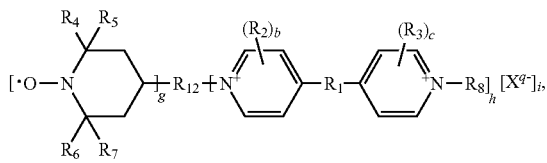

-continued
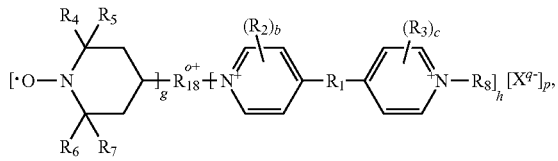
(VIIa)
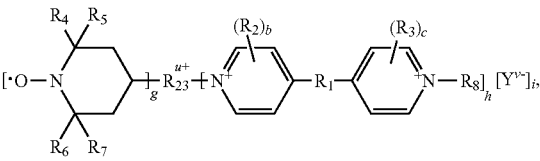
(VIIb)
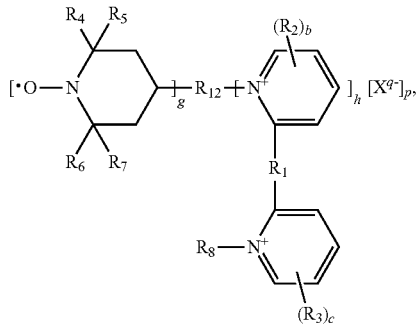
(VIII)
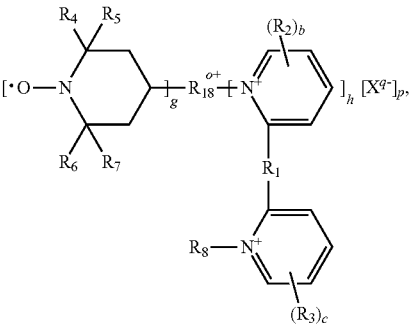
(VIIIa)
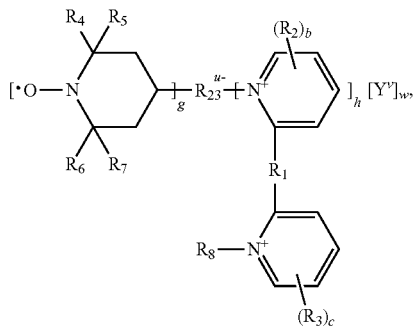
(VIIIb)
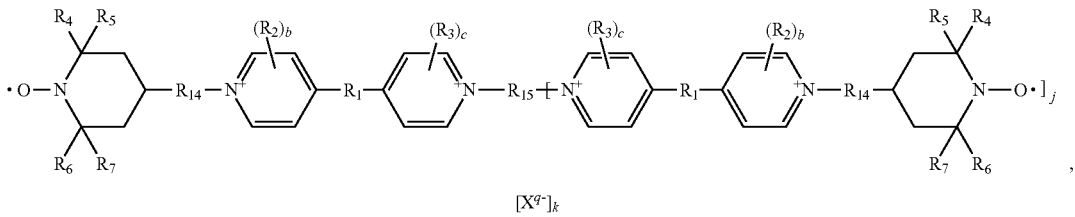
(IX)
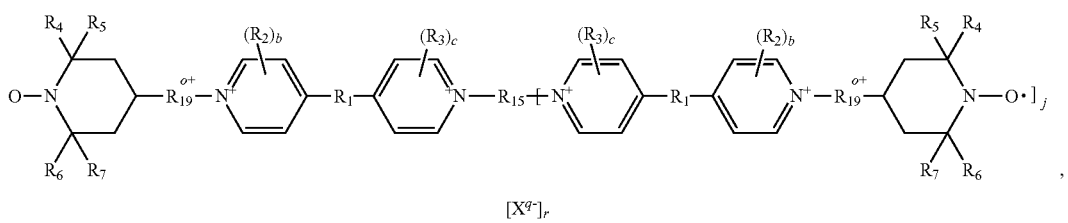
(IXa)
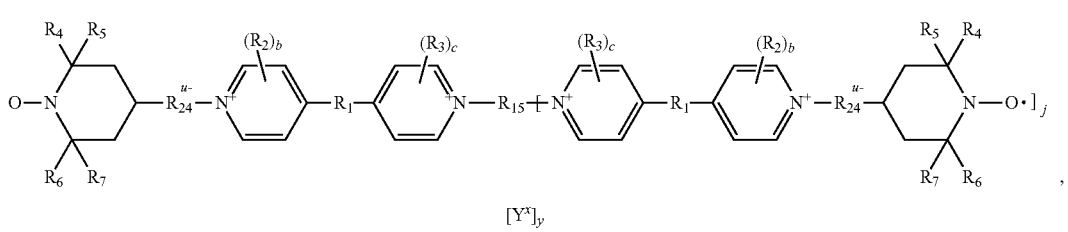
(IXb)

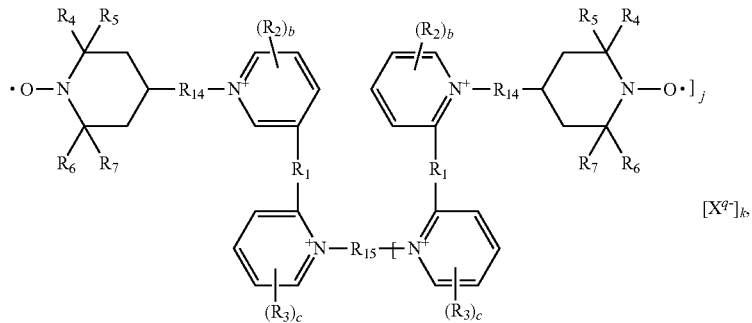
(X)
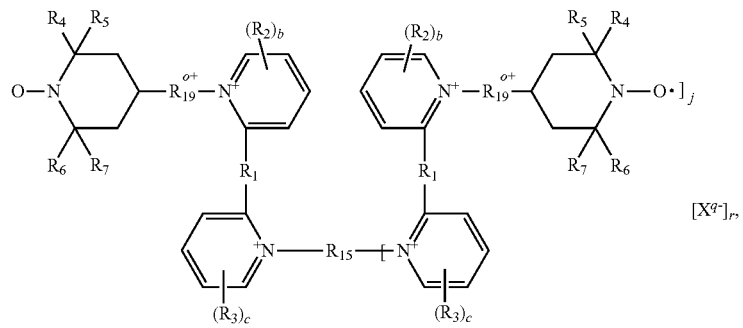
(Xa)
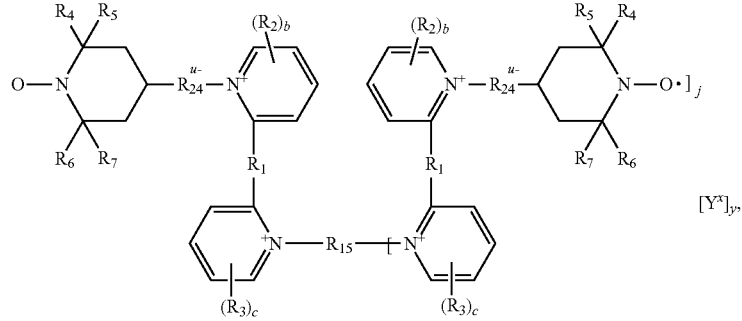
(Xb)
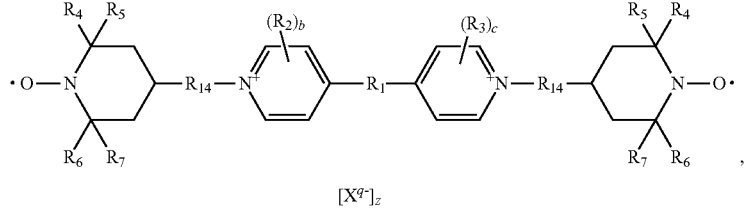
(XI)
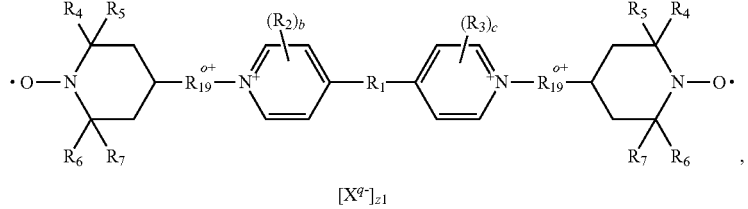
(XIa)
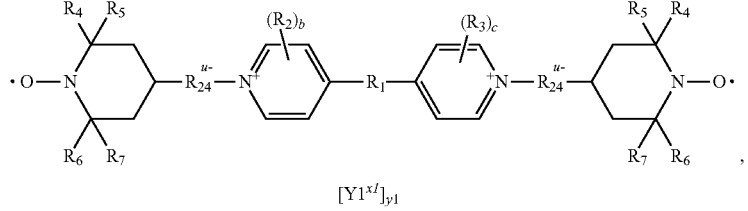
(XIb)

-continued

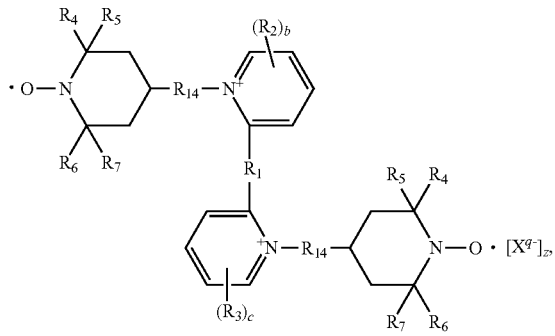

(XII)

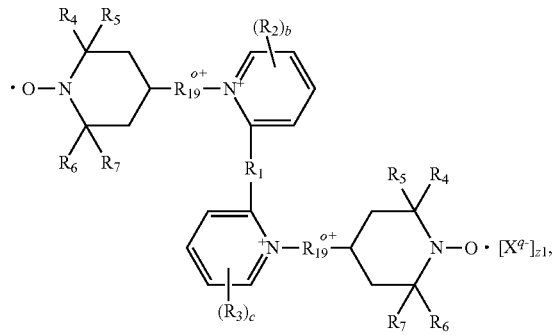

(XIIa)

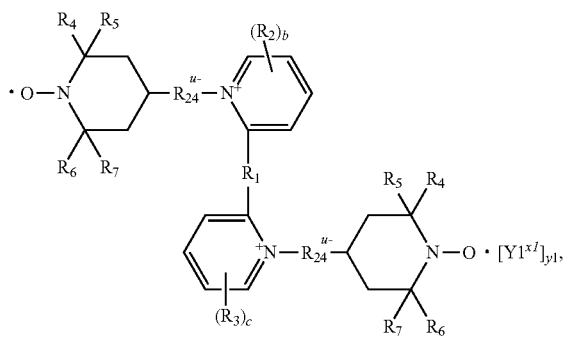

(XIIb)

wherein $R_1$, $R_2$, $R_3$, $R_4$, $R_5$, $R_6$, $R_7$ and X have the meaning defined above, $R_8$ and $R_{10}$ independently of one another represent hydrogen, alkyl that is optionally substituted with a carboxylic ester group, carboxylic amide group, carboxylic acid group, sulfonic acid group or amino group, cycloalkyl that is optionally substituted with a carboxylic ester group, carboxylic amide group, carboxylic acid group, sulfonic acid group or amino group, aryl that is optionally substituted with a carboxylic ester group, carboxylic amide group, carboxylic acid group, sulfonic acid group or amino group, aralkyl that is optionally substituted with a carboxylic ester group, carboxylic amide group, carboxylic acid group, sulfonic acid group or amino group, preferably $C_1$-$C_6$-alkyl or $C_1$-$C_6$-alkyl that is substituted with a carboxylic ester group, or $C_1$-$C_6$-alkyl that is substituted with a carboxylic amide group, or $C_1$-$C_6$-alkyl that is substituted with a carboxylic acid group, or $C_1$-$C_6$-alkyl that is substituted with a sulfonic acid group, or $C_1$-$C_6$-alkyl that is substituted with an amino group, and especially preferred hydrogen, propionate, isobutionate, ethyl or methyl, $R_9$ is a divalent to hexavalent, preferably a divalent to tetravalent organic bridge group, $R_{12}$ is a covalent bond or a divalent to hexavalent, preferably a divalent to tetravalent organic bridge group, $R_{14}$ is a covalent bond or a divalent organic bridge group, $R_{15}$ is a divalent to hexavalent, preferably a divalent to tetravalent organic bridge group, $R_{18}$ is an o-times positively charged divalent to hexavalent, preferably divalent to tetravalent organic residue, which is covalently connected via a carbon atom with the nitrogen atom of the bipyridyl residue, preferably a divalent to tetravalent quaternary ammonium residue, a divalent to tetravalent quaternary phosphonium residue, a divalent to trivalent ternary sulfonium residue or an o-times positively charged divalent to hexavalent, preferably a divalent to tetravalent heterocyclic residue, $R_{19}$ is an o-times, preferably single positively charged divalent organic residue, which is via a carbon atom covalently connected with the nitrogen atom of the bipyridyl residue, preferably a quaternary ammonium residue, a quaternary phosphonium residue, a ternary sulfonium residue or an o-times, preferably single positively charged divalent heterocyclic residue, $R_{20}$ and $R_{21}$ independently of one another represent hydrogen, alkyl which is optionally substituted with a carboxylic ester group, a carboxylic amide group, a carboxylic acid group, a sulfonic acid group or an amino group, cycloalkyl which is optionally substituted with a carboxylic ester group, a carboxylic amide group, a carboxylic acid group, a sulfonic acid group or an amino group, aryl which is optionally substituted with a carboxylic ester group, a carboxylic amide group, a carboxylic acid group, a sulfonic acid group or an amino group, or aralkyl which is optionally substituted with a carboxylic ester group, a carboxylic amide group, a carboxylic acid group, a sulfonic acid group or an amino group, or two of the residues $R_{20}$ and $R_{21}$ together form a $C_1$-$C_3$-alkylene group, preferably $C_1$-$C_6$-alkyl, $C_1$-$C_6$-alkyl substituted with a carboxylic ester group, $C_1$-$C_6$-alkyl substituted with a carboxylic amide group, $C_1$-$C_6$-alkyl substituted with a carboxylic acid group, $C_1$-$C_6$-alkyl substituted with a sulfonic acid group, or $C_1$-$C_6$-alkyl substituted with an amino group or together represent ethylene, and especially preferred propionate, isobutionate, ethyl or methyl or together are ethylene, $R_{22}$ is a divalent organic bridge group, $R_{23}$ represents an u-times negatively charged divalent to hexavalent, preferably divalent to tetravalent organic residue, which is via a carbon atom covalently connected with the nitrogen atom of the bipyridyl residue, preferably an alkylene residue substituted with one or two carboxyl- or sulfonic acid groups, a phenylene residue substituted with one or two carboxyl- or sulfonic acid groups or a divalent heterocyclic residue substituted with one or two carboxyl- or sulfonic acid groups, $R_{24}$ is an u-times, preferably a single negatively charged divalent organic residue, which is via a carbon atom covalently bound with the nitrogen atom of the bipyridyl residue, preferably an preferably an alkylene residue substituted with one carboxyl- or sulfonic acid group, a phenylene residue substituted with one carboxyl- or sulfonic acid group, or a divalent heterocyclic residue substituted with one carboxyl- or sulfonic acid group, a, b, c and q have the meaning defined above,
d is an integer from 1 to 5, preferably from 1 to 3,
e is a number having the value (2+2d+2t)/q,
g is an integer from 1 to 5, preferably from 1 to 3
h is an integer from 1 to 5, preferably from 1 to 3,
wherein the sum of g and h is an integer from 2 to 6, preferably from 2 to 4,
i is a number with the value 2h/q,
j is an integer from 1 to 5, preferably from 1 to 3,
k is a number with the value (2+2j)/q,
o is an integer from 1 to 4,
p is a number with the value (o+2h)/q,
r is a number with the value (3+3j)/q,
t is 0 or, if $R_9$ is a divalent organic bridge group, represents 0 or 1,
u is an integer from 1 to 4,
z is a number with the value 2/q,
z1 is a number with the value (o+2)/q
Y in case that 2h−u or 2 (2−u)−u are greater than 0, is a v- or x-valent inorganic or organic anion or a mixture of such anions, or in case that 2h−u or 2 (2−u)−u are smaller than 0, is a v- or x-valent inorganic or organic cation or a mixture of such cations,
v is an integer from −1 to −3 or from +1 to +3,
x is an integer from −1 to −3 or from +1 to +3,
w is 0 or a positive number with value (−u+2h)/v,
y is 0 or a positive number with value (2−u) (j+1)/x,
Y1 in case 2-2u is less than 0, is a x1-valent inorganic or organic cation or a mixture of such cations,
x1 is an integer from −1 to −3 or from +1 to +3, and
y1 is 0 or a positive number with value (2−2u)/x1.

Redox-active components more preferably used in the anolyte are compounds of formulae IVa, Va, VIIc, VIIIc, IXc and Xc

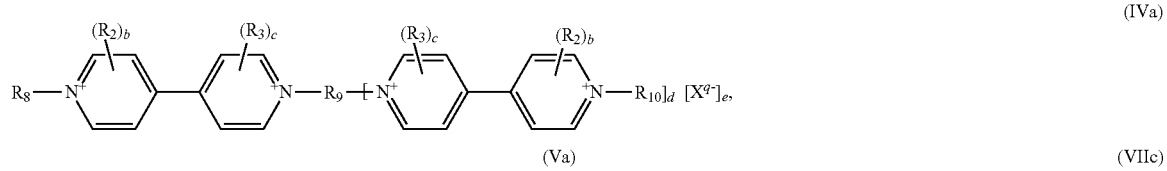

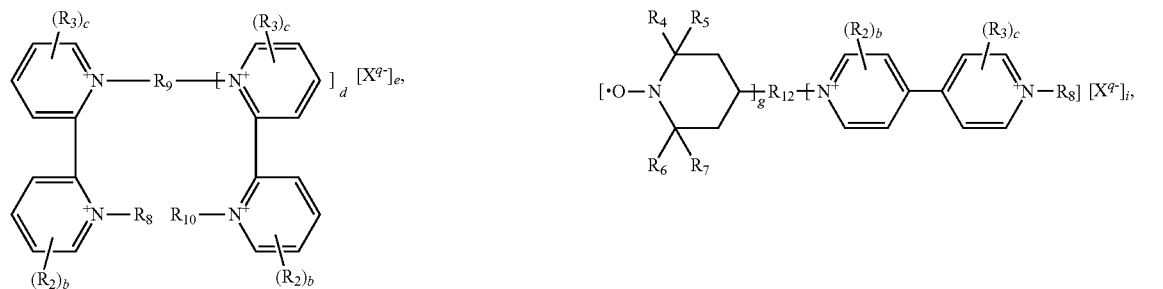

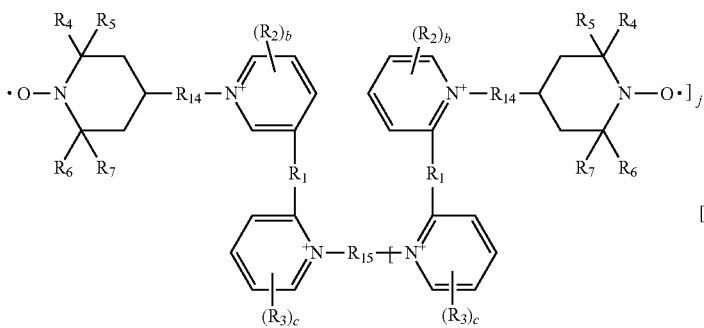

wherein $R_2$, $R_3$, $R_4$, $R_5$, $R_6$, $R_7$, $R_8$, $R_9$, $R_{10}$, $R_{12}$, $R_{14}$, $R_{15}$ and X have the meaning defined above, and b, c, d, e, g, h, i, j, k and q have the meaning defined above.

Redox-active components preferably used in the catholyte are compounds of formulae IIIa, IIIb, IIIc, VI, VIa and/or VIb as well as of above-defined formulae VII, VIIa, VIIb, VIII, VIIIb, VIIIa, IX, IXa, IXb, X, Xa and/or Xb

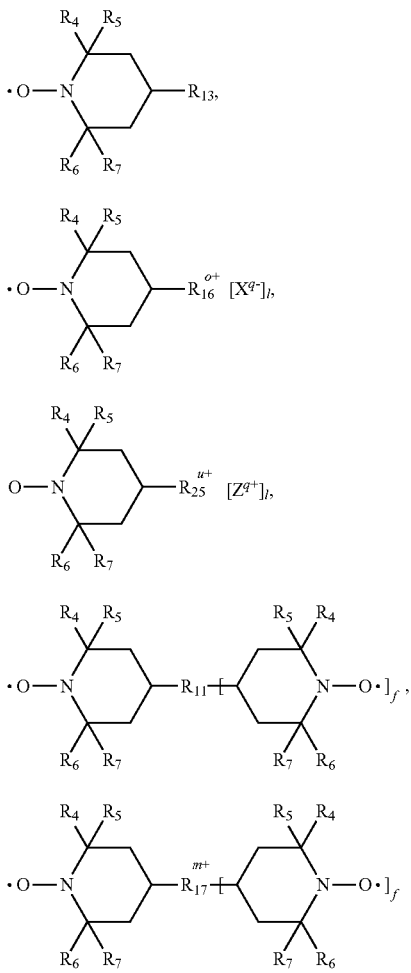

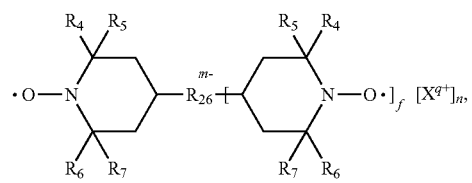

wherein $R_4$, $R_5$, $R_6$, $R_7$, X, o, u and q have the meaning defined above, $R_{11}$ is a divalent to tetravalent organic bridge group, $R_{13}$ is hydrogen, alkyl, alkoxy, haloalkyl, cycloalkyl, aryl, aralkyl, heterocyclyl, halogen, hydroxy, amino, nitro or cyano, and $R_{16}$ is an o-times, preferably a single positively charged monovalent organic residue, preferably a quaternary ammonium residue, a quaternary phosphonium residue, a ternary sulfonium residue or an u-times, preferably a single positively charged monovalent heterocyclic residue, $R_{17}$ is a i-times positively charged divalent to tetravalent organic residue, preferably a divalent to tetravalent quaternary ammonium residue, a divalent to tetravalent quaternary phosphonium residue, a divalent to tetravalent ternary sulfonium residue or a i-times positively charged divalent to tetravalent heterocyclic residue, $R_{25}$ is an u-times, preferably a single negatively charged monovalent residue, preferably a carboxyl residue or a sulfonic acid residue or an u-times, preferably a single negatively charged monovalent heterocyclic residue, $R_{26}$ is a m-times negatively charged divalent to tetravalent organic residue, preferably an alkylene residue substituted with one or two carboxyl groups or sulfonic acid groups, or a phenylene residue substituted with one or two carboxyl groups or sulfonic acid groups, or a divalent heterocyclic residue substituted with one or two carboxyl groups or sulfonic acid groups, Z is a q-valent inorganic or organic cation or a mixture of such cations, f is an integer from 1 to 3, l is a number with the value o/q or u/q, m is an integer from 1 to 4, and n represents a number with the value m/q.

Especially preferred redox-active components used in the catholyte are compounds of the above-defined formulae VI, VIa, VIIc, VIIIc, IXc and/or Xc.

Redox-active components used very preferably preferred according to the invention are those of formulae Ib, IIb, VIId, VIIe, VIIId and/or VIIIe

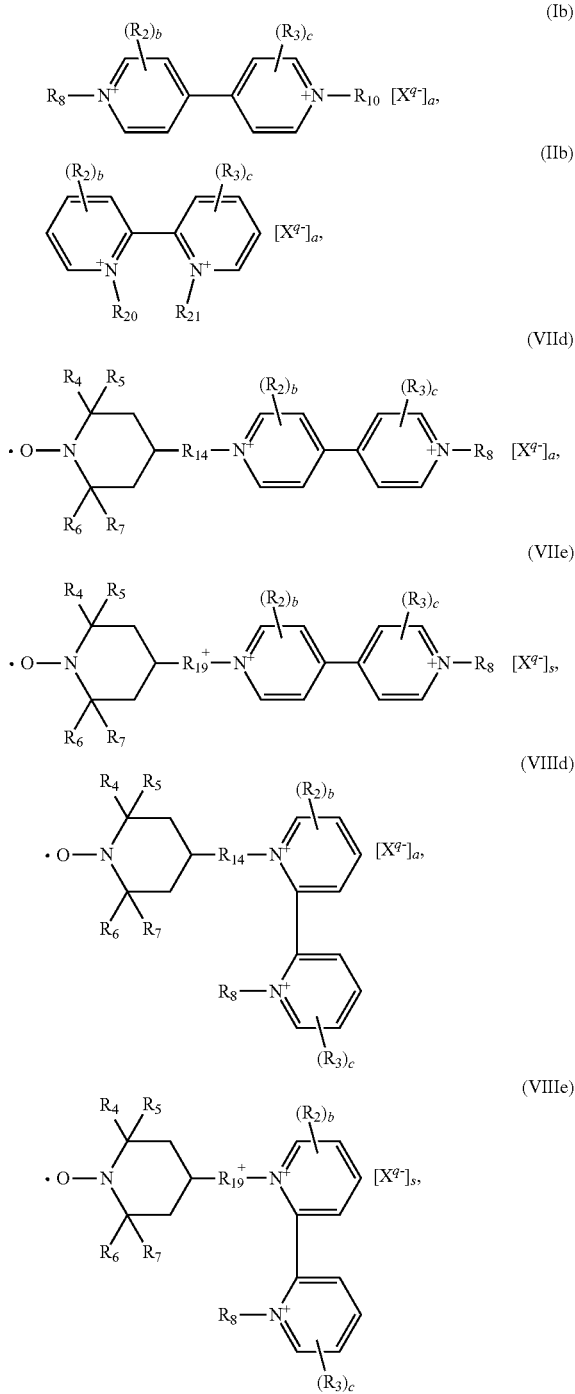

wherein
R$_2$, R$_3$, R$_4$, R$_5$, R$_6$, R$_7$, R$_8$, R$_{10}$, R$_{14}$, R$_{19}$ and X have the meaning defined above,
R$_{20}$ and R$_{21}$ independently of one another are hydrogen, alkyl which is optionally substituted with a carboxylic ester group, a carboxylic amide group, a carboxylic acid group, a sulfonic acid group or an amino group, cycloalkyl which is optionally substituted with a carboxylic ester group, a carboxylic amide group, a carboxylic acid group, a sulfonic acid group or an amino group, aryl which is optionally substituted with a carboxylic ester group, a carboxylic amide group, a carboxylic acid group, a sulfonic acid group or an amino group, or aralkyl which is optionally substituted with a carboxylic ester group, a carboxylic amide group, a carboxylic acid group, a sulfonic acid group or an amino group, or two of the residues R$_{20}$ and R$_{21}$ together form a C$_1$-C$_3$-alkylene group, preferably C$_1$-C$_6$-alkyl, C$_1$-C$_6$-alkyl which is substituted with a carboxylic ester group, C$_1$-C$_6$-alkyl which is substituted with a carboxylic amide group, C$_1$-C$_6$-alkyl which is substituted with a carboxylic acid group, C$_1$-C$_6$-alkyl which is substituted with a sulfonic acid group, or C$_1$-C$_6$-alkyl which is substituted with an amino group, or together form ethylene, and especially preferred propionate, isobutionate, ethyl or methyl or together represent ethylene,
a, b, c and q have the meaning defined above, and
s is a number with value 3/q.
Of these preferably preferred compounds those of formulae Ib, IIb, VIId, VIIe, VIIId and/or VIIIe are used in the anolyte and those of formulae VIId, VIIe, VIIId and/or VIIIe are used in the catholyte.
Very preferably preferred the catholyte contains compounds of the above defined formulae IIIa, IIIb or IIIc and the anolyte contains compounds of the above-defined formulae Ib or IIb.
Most preferred the catholyte contains compounds of the above defined formula IIIb and the anolyte contains compounds of the above defined formula Ib.
Examples for preferred compounds of formula IIIb are salts of the 2,2,6,6-tetramethylpiperidine-4-(N,N,N-trialkylammonium), especially salts of 2,2,6,6,-tetramethylpiperidine-4-(N,N,N-trimethylammonium) and most preferred 2,2,6,6-tetramethylpiperidine-4-(N, N, N-trimethylammonium)-chloride.
Examples for preferred compounds of formula Ib are salts of N,N'-dialkylviologen, preferably salts of N,N'-dimethylviologen a especially preferred N,N'-dialkylviologen chloride.
Especially preferred redox-active compounds are those of the above defined formulae VII, VIIa, VIIb, VIIc, VIId, VIIe, VIII, VIIIa, VIIIb, VIIIc, VIIId, VIIIe, IX, IXa, IXb, IXc, X, Xa, Xa and Xc. These contain as well as electroactive bipyridyl residues and electroactive nitroxide residues and can be used as well as in the catholyte and in the anolyte, preferably in both chambers the same compounds.
The redox-active compounds of the above defined formulae VII, VIIa, VIIb, VIIc, VIId, VIIe, VIII, VIIIa, VIIIb, VIIIc, VIIId, VIIIe, IX, IXa, IXb, IXc, X, Xa, Xb and Xc are combinations of positive and negative redox-active units (TEMPO and viologen). So far, these redox-active units have always been used only in the form of two different substances. The combined molecules particularly preferred according to the invention can be both oxidized and reduced. One of the resulting advantages is that the solutions caused by mixing, for example through membrane defects, are no longer irreversibly damaged. Moreover, the potentials can be adjusted by selecting the two redox-active units and thus be optimized for different application scenarios.
If one of the residues R$_2$, R$_3$, R$_4$, R$_5$, R$_6$, R$_7$, R$_8$, R$_{10}$, R$_{13}$, R$_{20}$ and/or R$_{21}$ is alkyl, the alkyl group can be both branched and unbranched. An alkyl group typically contains one to twenty carbon atoms, preferably one to ten carbon atoms. Examples of alkyl groups are: methyl, ethyl, n-propyl, isopropyl, n-butyl, sec-butyl, tert.-butyl, pentyl, n-hexyl, n-heptyl, 2-ethylhexyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl or eicosyl. Alkyl groups with one to six carbon atoms are particularly preferred. Alkyl groups may be substituted, for example with carboxyl groups or sulfonic acid groups, with carboxylic ester groups or sulfonic ester groups, with carboxyl amide groups or sulfonamide groups, with hydroxyl groups or amino groups or with halogen atoms.

If one of the residues $R_2$, $R_3$ and/or $R_{13}$ is alkoxy, the alkoxy groups can consist of a alkyl unit that can be both branched and unbranched. An alkoxy groups typically contains one to twenty carbon atoms, preferably one to ten carbon atoms. Examples of alkoxy groups are: methoxy, ethoxy, isopropoxy, n-butoxy, sec.-butoxy, tert.-butoxy, pentyloxy, n-hexyloxy, n-heptyloxy, 2-ethylhexyloxy, n-octyloxy, n-nonyloxy, n-decyloxy, n-tridecyloxy, n-tetradecyloxy, n-pentadecyloxy, n-hexadecyloxy, n-octadecyloxy or eicosyloxy. Alkoxy groups with one to six carbon atoms are particularly preferred.

If one of the residues $R_2$, $R_3$ and/or $R_{13}$ is haloalkyl, the haloalkyl group can be both branched and unbranched. A haloalkyl group typically contains one to twenty carbon atoms, which in turn are substituted separately with one or more halogen atoms, preferably one to ten carbon atoms. Examples of halogen atoms are fluorine, chlorine, bromine or iodine. Fluorine and chlorine are preferred. Examples of haloalkyl groups are: trifluoromethyl, difluoromethyl, fluoromethyl, bromodifluoro-methyl, 2-chloroethyl, 2-bromoethyl, 1.1-difluoroethyl, 2, 2, 2-trifluoroethyl, 1,1,2,2-tetrafluoroethyl, 2-chloro-1,1,2-trifluoroethyl, pentafluoroethyl, 3-bromopropyl, 2,2,3,3-tetrafluoropropyl, 1,1,2,3,3,3-hexafluoropropyl, 1,1,1,3,3,3-hexafluoropropyl, 3-bromo-2-methylpropyl, 4-bromobutyl, perfluoropentyl.

If one of the residues $R_2$, $R_3$, $R_4$, $R_5$, $R_6$, $R_7$, $R_8$, $R_{10}$, $R_{13}$, $R_{20}$ and/or $R_{21}$ is cycloalkyl the cycloalkyl group typically is a cyclic group containing three to eight, preferably five, six or seven ring carbon atoms, each independently of one another may be substituted. Examples of substituents are alkyl groups or two alkyl groups, which together with the ring carbons to which they are attached can form another ring. Examples of cycloalkyl groups are: cyclopropyl, cyclopentyl, or cyclohexyl. Cycloalkyl groups may be substituted, for example with carboxyl groups or sulfonic acid groups, with carboxylic ester groups or with sulfonic ester groups, with carboxylamide groups or with sulfonamide groups, with hydroxyl groups or amino groups or with halogen atoms.

If one of the residues $R_2$, $R_3$, $R_4$, $R_5$, $R_6$, $R_7$, $R_8$, $R_{10}$, $R_{13}$, $R_{20}$ and/or $R_{21}$ is aryl, the aryl group typically is a cyclic aromatic group containing five to fourteen carbon atoms, each independently of one another may be substituted. Examples of substituents are alkyl groups or two alkyl groups, which together with the ring carbon atoms to which they are attached can form another ring. Examples of aryl groups are phenyl, biphenyl, anthryl or phenantolyl. Aryl groups may be substituted, for example with carboxyl groups or sulfonic acid groups, with carboxyl ester groups or sulfonic ester groups, with carboxylamide groups or sulfonamide groups, with hydroxyl groups or amino groups or with halogen atoms.

If one of the residues $R_2$, $R_3$ and/or $R_{13}$ is heterocyclyl, the heterocyclyl group typically is a cyclic group containing four to ten ring carbon atoms and at least one ring hetero atom, each independently of one another may be substituted. Examples of substituents are alkyl groups or two alkyl groups, which together with the ring carbon atoms to which they are attached can form another ring. Examples of hetero atoms are oxygen, nitrogen, phosphorous, boron, selenium or sulfur. Examples of heterocyclyl groups are furyl, thienyl, pyrrolyl or imidazolyl. Heterocyclyl groups preferably are aromatic. Heterocyclyl groups may be substituted, for example with carboxyl groups or sulfonic acid groups, with carboxyl ester groups or sulfonic ester groups, with carboxylamide groups or sulfonamide groups, with hydroxyl groups or amino groups or with halogen atoms.

If one of the residues $R_2$, $R_3$, $R_4$, $R_5$, $R_6$, $R_7$, $R_8$, $R_{10}$, $R_{13}$, $R_{20}$ and/or $R_{21}$ is aralkyl, the aralkyl group typically is an aryl group, wherein aryl has been previously defined, which is covalently attached to an alkyl group. The aralkyl group can be substituted on the aromatic ring for example with alkyl groups or with halogen atoms. An example of an aralkyl group is benzyl. Aralkyl groups may be substituted, for example, with carboxyl groups or sulfonic acid groups, with carboxyl ester groups or sulfonic ester groups, with carboxylamide groups or sulfonamide groups, with hydroxyl groups or amino groups or with halogen atoms.

If one of the residues $R_2$, $R_3$ and/or $R_{13}$ is amino, the amino group may be un-substituted or may carry one or two or three substituents, preferably alkyl and/or aryl groups. Alkyl substituents may be branched or unbranched. A mono- or dialkylamino group typically contains one or two alkyl groups with one to twenty carbon atoms, preferably with one to six carbon atoms. Examples for monoalkylamino groups are: methylamino, ethylamino, propylamino or butylamino. Examples for dialkylamino groups are: diethylamino, dipropylamino or dibutylamino. Examples for trialkylamino groups are: triethylamino, tripropylamino or tributylamino.

If one of the residues $R_2$, $R_3$ and/or $R_{13}$ is halogen, this shall mean a covalent bound fluorine, chlorine, bromine or iodine atom. Preferred are fluorine or chlorine.

If $R_1$ means a divalent bridge group, it is to be understood a divalent inorganic or organic residue. Examples of divalent inorganic residues are —O—, —S—, —SO—, —SO$_2$—, —OP(O)O— or —NH—. Examples of divalent organic residues are alkylene, cycloalkylene, arylene, aralkylene, or heterocyclylene.

If $R_{14}$ and $R_{22}$ mean a divalent organic bridge group, this it is to be understood as an organic residue, which is connected via two covalent bonds to the remainder of the molecule. Examples of divalent organic residues $R_{14}$ or $R_{22}$ are alkylene, alkyleneoxy, poly(alkyleneoxy), alkyleneamino, poly(alkyleneamino), cycloalkylene, arylene, aralkylene, or heterocyclylene.

Alkylene groups can be both branched and unbranched. An alkylene group typically contains one to twenty carbon atoms, preferably two to four carbon atoms. Examples of alkylene groups are: methylene, ethylene, propylene and butylene. Alkylene groups may be substituted, for example with carboxyl groups or sulfonic acid groups, with carboxylic ester groups or sulfonic ester groups, with carboxylamide groups or sulfonamide groups, with hydroxyl groups or amino groups or with halogen atoms.

Alkyleneoxy and poly(alkyleneoxy) groups can contain both branched and unbranched alkylene groups. An alkylene group occurring in an alkyleneoxy or poly(alkyleneoxy) group typically contains two to four carbon atoms, preferably two or three carbon atoms. The number of repeat units in the poly(alkyleneoxy) groups can vary in a wide range. Typical numbers of repeat units are in the range from 2 to 50. Examples of alkyleneoxy groups are: ethyleneoxy, propyleneoxy and butyleneoxy. Examples of poly(alkyleneoxy) groups are: poly(ethyleneoxy), poly(propyleneoxy) and poly(butyleneoxy).

Alkyleneamino and poly(alkyleneamino) groups can contain both branched and unbranched alkylene groups. An alkylene group occurring in an alkyleneamino or poly(alkyleneamino) group typically contains two to four carbon atoms, preferably two or three carbon atoms. The number of repeat units in the poly(alkyleneamino) groups can vary in a wide range. Typical numbers of repeat units are in the range from 2 to 50. Examples of alkyleneamino groups are: ethyleneamino, propyleneamino and butyleneamino. Examples for poly(alkyleneamino) groups are: poly(ethyleneamino), poly(propyleneamino) and poly(butyleneamino).

Cycloalkylene groups typically contain five, six or seven ring carbon atoms, each of which can be substituted independently of one another. Examples of substituents are alkyl groups or two alkyl groups, which together with the ring carbons to which they are attached can form another ring. An example of a cycloalkylene group is cyclohexylene. Cycloalkylene groups may be substituted, for example, with carboxyl groups or sulfonic acid groups, with carboxylic ester groups or sulfonic ester groups, with carboxylamide groups or sulfonamide groups, with hydroxyl groups or amino groups, or with halogen atoms.

Arylene groups typically are cyclic aromatic groups comprising five to fourteen carbon atoms, each of which can be substituted independently of one another. Examples of arylene groups are o-phenylene, m-phenylene, p-phenylene, o-biphenylyl, m-biphenylyl, p-biphenylyl, 1-anthryl, 2-anthryl, 9-anthryl, 1-phenantolyl, 2-phenantolyl, 3-phenantolyl, 4-phenantolyl or 9-phenantolyl. Arylene groups optionally can be substituted, for example with carboxyl groups or sulfonic acid groups, with carboxylic ester groups or sulfonic ester groups, with carboxyl amide groups or sulfonamide groups, with hydroxyl groups or amino groups or with halogen atoms. Additional examples for substituents are alkyl groups or two alkyl groups, which together with the ring carbon atoms to which they are attached can form another ring.

Heterocyclyl groups typically are cyclic groups containing four to ten ring carbon atoms and at least one ring hetero atom, each of which can be substituted independently of one another. Examples of hetero atoms are oxygen, nitrogen, phosphorous, boron, selenium or sulfur. Examples of heterocyclyl groups are furanediyl, thiophenediyl, pyrroldiyl or imidazolediyl. Heterocyclyl groups preferably are aromatic. Heterocyclyl groups optionally can be substituted, for example with carboxyl groups or sulfonic acid groups, with carboxyl ester groups or sulfonic ester groups, with carboxylamide groups or sulfonamide groups, with hydroxyl groups or amino groups or with halogen atoms. Additional examples for substituents are alkyl groups or two alkyl groups, which together with the ring carbon atoms to which they are attached can form another ring.

Aralkylene groups typically are aryl groups, to which one or two alkyl groups are covalently attached. Aralkyl groups can be covalently attached with the remainder of the molecule via their aryl residue and their alkyl residue or via two alkyl residues. The aralkylene group may be substituted at its aromatic ring, for example, with alkyl groups or with halogen atoms. Examples for aralkylene groups are benzylene or dimethylphenylene (xylylene).

If one of the residues $R_9$, $R_{11}$, $R_{12}$ or $R_{15}$ is a divalent to hexavalent organic bridge group, this is to be understood as an organic residue, which is connected to the remainder of the molecule via two, three, four, five or six covalent bonds.

Examples of divalent organic residues are alkylene, alkyleneoxy, poly(alkylene-oxy), alkyleneamino, poly(alkyleneamino), cycloalkylene, arylene, aralkylene or heterocyclylene. These residues have been already described in detail earlier.

Examples of trivalent organic residues are alkyltriyl, alkoxytriyl, tris-poly(alkyleneoxy), tris-poly(alkyleneamino), cycloalkyltriyl, aryltriyl, aralkyltriyl or heterocyclyltriyl. These residues correspond to the divalent residues already described above, with the difference that they are connected to the remainder of the molecule by three covalent bonds instead of two covalent bonds.

Examples of tetravalent organic residues are alkylquaternyl, alkoxyquaternyl, quater-poly(alkyleneoxy), quaterpoly(alkyleneamino), cycloalkylquaternyl, arylquaternyl, aralkylquaternyl or heterocyclylquaternyl. These residues correspond to the divalent residues already described above, with the difference that they are connected to the remainder of the molecule by four covalent bonds instead of two covalent bonds.

Examples of pentavalent organic residues are alkylquinquinyl, alkoxyquinquinyl, quinqui-poly(alkyleneoxy), quinqui-poly(alkyleneamino), cycloalkylquinquinyl, aryl-quinquinyl, aralkylquinquinyl or heterocyclylquinquinyl. These residues correspond to the divalent residues already described above, with the difference that they are connected to the remainder of the molecule by five covalent bonds instead of two covalent bonds.

Examples of hexavalent organic residues are alkylhexyl, alkoxyhexyl, hexyl-poly(alkyleneoxy), hexyl-poly(alkyleneamino), cycloalkylhexyl, arylhexyl, aralkylhexyl or heterocyclylhexyl. These residues correspond to the divalent residues already described above, with the difference that they are connected to the remainder of the molecule by six covalent bonds instead of two covalent bonds.

$R_{16}$ is an o-times positively charged, preferably a single positively charged monovalent organic residue. This is usually alkyl, alkoxy, haloalkyl, cycloalkyl, aryl, aralkyl or heterocyclyl, which contains one to four positively charged residues, in particular quaternary ammonium residues, quaternary phosphonium residues, ternary sulfonium residues or a one- to four-times charged monovalent heterocyclic residue. The charge is compensated via the anion(s) $X^{q-}$. The connection of the o-times positively charged residue to the piperidine-1-oxyl residue is preferably performed via the hetero atom of the o-times positively charged residue. Particularly preferred examples of residues $R_{16}$ are the residues —$N^+R_{26}R_{27}R_{28}$, —$P^+R_{26}R_{27}R_{28}$, —$S^+R_{26}R_{27}$ or —$Het^+$, wherein $R_{26}$, $R_{27}$ und $R_{28}$ independently of one another are hydrogen, alkyl, cycloalkyl, aryl, aralkyl or heterocyclyl, in particular $C_1$-$C_6$-alkyl, cyclohexyl, phenyl or benzyl, and Het is a monovalent and one-times positively charged heterocyclic residue, which has one to three ring nitrogen atoms or one ring nitrogen atom and one to two ring oxygen atoms or ring sulfur atoms, especially preferred a monovalent residue of imidazolium, pyridinium, guanidinium, uronium, thiouronium, piperidinium or morpholinium.

$R_{19}$ is an o-times positively charged, preferably a single positively charged divalent organic residue. This is usually alkylene, haloalkylene, cycloalkylene, arylene, aralkylene or heterocyclylene, which contains one to four positively charged residues, in particular one to four quaternary ammonium residues, one to four quaternary phosphonium residues, one to four ternary sulfonium residues or a one to four times positively charged divalent heterocyclic residue. The charge is compensated via the anion(s) $X^{q-}$. The connection of the o-times positively charged residues to the piperidine-1-oxyl residue is preferably performed via the hetero atom of the single positively charged residue. The connection between $R_{19}$ and the nitrogen atom of the bipyridyl residue is performed via a carbon atom of the $R_{19}$ residue. Particularly preferred examples of residues $R_{19}$ are the residues —$N^+R_{26}R_{27}R_{29}$—, —$P^+R_{26}R_{27}R_{29}$—, —$S^+R_{26}R_{29}$— or —$Het^+$-, wherein $R_{26}$ and $R_{27}$ independently of one another are hydrogen, alkyl, cycloalkyl, aryl, aralkyl or heterocyclyl, in particular $C_1$-$C_6$-alkyl, cyclohexyl, phenyl or benzyl, $R_{29}$ represents a divalent organic residue, and Het represents a divalent and single positively charged heterocyclic residue, which contains one to three ring nitrogen atoms or one ring nitrogen atom and one to two ring oxygen atoms or ring sulfur atoms, especially preferred a monovalent residue of imidazolium, pyridinium, guanidinium, uronium, thiouronium, piperidinium or morpholinium.

$R_{17}$ is an m-times positively charged divalent to tetravalent organic residue. This is an organic residue, which has m positively charged groups and which is connected to the remainder of the molecule by two, three or four covalent bonds. Examples of positively charged residues are quaternary ammonium, quaternary phosphonium, ternary sulfonium or an m-times charged divalent to tetravalent heterocyclic residue. The connection of the m-times positively charged residue to the piperidine-1-oxyl residue is preferably performed via the hetero atoms of the m-times positively charged residue. Particularly preferred examples of residues $R_{17}$ are the residues —$N^+R_{30}R_{31}$—[$R_{32}$—$N^+R_{30}R_{31}$]$_f$—, —$P^+R_{30}R_{31}$—[$R_{32}$—$PR_{30}R_{31}$]$_f$—, —$S^+R_{30}$—[$R_{24}$—$S^+R_{30}$]$_f$— or [Het$^{m+}$,]$_f$— wherein $R_{30}$ and $R_{31}$ independently of one another are alkyl, cycloalkyl, aryl, aralkyl or heterocyclyl, in particular $C_1$-$C_6$-alkyl, cyclohexyl, phenyl or benzyl, f has the above defined meaning, $R_{32}$ represents an f+1-valent organic residue and Het represents a divalent to tetravalent and m-times positively charged heterocyclic residue, which contains one to three ring nitrogen atoms or a ring nitrogen atom and one to two ring oxygen atoms or ring sulfur atoms, especially preferably a divalent to tetravalent residue of imidazolium, pyridinium, guanidinium, uronium, thiouronium, piperidinium, or morpholinium.

$R_{18}$ is an o-times positively charged divalent to tetravalent organic residue. This is an organic residue, which has o positively charged groups and which is connected to the remainder of the molecule by two, three or four covalent bonds. $R_{18}$ is covalently linked to the nitrogen atom of the bipyridyl residues via a carbon atom. Examples of positively charged residues are quaternary ammonium, quaternary phosphonium, ternary sulfonium, or an o-times charged divalent to tetravalent heterocyclic residue.

The connection of the o-times positively charged residue to the piperidine-1-oxyl residue is preferably performed via the heteroatoms of the o-times positively charged residue. Particularly preferred examples of residues $R_{18}$ are the residues —[$N^+R_{30}R_{31}$]$_g$—[$R_{33}$—$N^+R_{30}R_{31}$]$_h$—, —[$P^+R_{30}R_{31}$]$_g$—[$R_{33}$—$PR_{30}R_{31}$]$_h$—, —[$S^+R_{30}$]$_g$—[$R_{33}$—$S^+R_{30}$]$_h$— or [Het$^{m+}$,]$_{g+h}$—, wherein $R_{30}$ und $R_{31}$ independently of one another are alkyl, cycloalkyl, aryl, aralkyl or heterocyclyl, in particular $C_1$-$C_6$-alkyl, cyclohexyl, phenyl or benzyl, g and h have the above-defined meanings, $R_{33}$ is a g+h-valent organic residue and Het represents a divalent to tetravalent and o-times positively charged heterocyclic residue comprising one to three ring nitrogen atoms or a ring nitrogen atom and one to two ring oxygen atoms or ring sulfur atoms, especially preferred a divalent to tetravalent residue of imidazolium, pyridinium, guanidinium, uronium, thiouronium, piperidinium or morpholinium.

Examples of divalent organic residues $R_{29}$, $R_{32}$ and $R_{33}$ are alkylene, cycloalkylene, arylene, aralkylene or heterocyclylene. These residues have already been described in detail above.

Examples of trivalent organic residues $R_{32}$ and $R_{33}$ are alkyltriyl, cycloalkyltriyl, aryltriyl, aralkyltriyl or heterocyclyltriyl. These residues correspond to the divalent residues already described in detail above with the difference that these are connected via three covalent bonds instead of two covalent bonds with the remainder of the molecule.

Examples of tetravalent organic residues $R_{32}$ and $R_{33}$ are alkylquaternyl, cycloalkylquaternyl, arylquaternyl, aralkylquaternyl or heterocyclylquaternyl. These residues correspond to the divalent residues already described in detail above with the difference that these are connected via four covalent bonds instead of two covalent bonds with the remainder of the molecule.

$R_{23}$ is an u-times negatively charged divalent to tetravalent organic residue. This is an organic residue, which has u negatively charged groups and is connected to the remainder of the molecule by two, three or four covalent bonds. $R_{23}$ is covalently linked to the nitrogen atom of the bipyridyl residue via a carbon atom. Examples of negatively charged residues are alkylene residues or arylene residues substituted with carboxylic acid or sulfonic acid residues, wherein hydrocarbon units of the alkylene residues or several arylene residues may be interrupted by one or more —O—, —CO—O—, —CO—NH— or —NH— groups, or a divalent to tetravalent heterocyclic residue which is substituted with up to two carboxylic acid or sulfonic acid residues. The connection of the u-times negatively charged residue to the piperidine-1-oxyl residue is preferably performed via carbon atoms of the u-times negatively charged residue. Particularly preferred examples of residues $R_{23}$ are alkylene residues or arylene residues which are substituted with one or two carboxylic acid or sulfonic acid residues.

$R_{24}$ is an u-times negatively charged, preferably a single negatively charged divalent organic residue. This is usually alkylene, haloalkylene, cycloalkylene, arylene, aralkylene or heterocyclylene, which contains one to four single negatively charged residues, in particular an alkylene or arylene residue with one to four carboxylic acid or sulfonic acid substituents, wherein the hydrocarbon units of the alkylene residues or several arylene residues may be interrupted by one or more —O—, —CO—O—, —CO—NH— or —NH— groups, or a divalent heterocyclic residue that is one to four times negatively charged. The charge compensation is carried out via the anion(s) $X^{q-}$ or via the cation(s) $Y^{x+}$. The connection of the u-times negatively charged residue to the piperidine-1-oxyl residue is preferably performed via a carbon atom of the u-times negatively charged residue. The connection between $R_{24}$ and the nitrogen atom of the bipyridyl residue is performed via a carbon atom of the $R_{24}$ residue.

$R_{25}$ is an u-times negatively charged, preferably a single negatively charged monovalent organic residue. This is usually alkyl, alkoxy, haloalkyl, cycloalkyl, aryl, aralkyl or heterocyclyl, which contains one to four single negatively charged residues, in particular one to four carboxylic acid residues or one to four sulfonic acid residues or a monovalent heterocyclic residue which is substituted with one to four carboxylic acid residues or with one to four sulfonic acid residues. The charge compensation is carried out via the cation(s) $Z^{q+}$. The connection of the u-times negatively charged residue to the piperidine-1-oxyl residue is preferably performed via a carbon atom of the single negatively charged residue.

The redox-active components with one to six residues of formula I or with one to six residues of formula II in the molecule used according to the invention contain counter ions $X^{q-}$. These will compensate for the ionic charges arising during loading or unloading. The counter ions $X^{q-}$ can be inorganic or organic q-valent anions.

Examples of inorganic anions $X^{q-}$ are halogenide ions, such as fluoride, chloride, bromide or iodide, or hydroxide ions or anions of inorganic acids, such as phosphate, sulfate, nitrate, hexafluorophosphate, tetrafluoroborate, perchlorate, chlorate, hexafluoroantimonate, hexafluoroarsenate, cyanide.

Examples of organic anions $X^{q-}$ are anions of mono- or polyvalent carboxylic acids or of mono- or polyvalent sulfonic acids, wherein these acids may be saturated or unsaturated. Examples of anions of organic acids are acetate, formiate, trifluoro-acetate, trifluoromethanesulfonate, pentafluoroethanesulfonate, nonofluorobutane-sulfonate, butyrate, citrate, fumarate, glutarate, lactate, malate, malonate, oxalate, pyruvate or tartrate.

Furthermore, the redox-active components used in the invention may contain inorganic cations, such as single- or multi-valent metal ions, or organic cations, such as ammonium, imidazolium, pyridinium, guanidinium, uronium, thiouronium, piperidinium, morpholinium or phosphonium. The charge is compensated by the anions $X^{q-}$.

In some cases, the redox-active components used according to the invention carry one or more negative charges. Here the charge is compensated by counterions $Y^x$ or $Z^{q+}$. However, there may also be cases in which the redox-active components have a zwitterionic structure and do not need any further anions or cations for charge balancing.

The anions $Y^{x-}$ can be inorganic or organic X-valent anions. Examples of anions $Y^{x-}$ correspond to those mentioned above as examples for anions $X^{q-}$.

The cations $Y^{x+}$ may be inorganic or organic X-valent cations. Examples are X-valent metal ions, or X-valent organic cations, such as ammonium, imidazolium, pyridinium, guanidinium, uronium, thiouronium, piperidinium, morpholinium, or phosphonium. Preferably monovalent or divalent metal ions, especially preferred alkali or earth alkaline cations are used.

The cations $Z^{q+}$ may be inorganic or organic q-valent cations. Examples are q-valent metal ions, or q-valent organic cations, such as ammonium, imidazolium, pyridinium, guanidinium, uronium, thiouronium, piperidinium, morpholinium, or phosphonium.

Preferably used are monovalent or divalent metal ions, especially preferred alkali or earth alkaline cations.

Preferably used in the redox flow cells of the invention are compounds comprising halogenide ions, hydroxide ions, phosphate ions, sulfate ions, perchlorate ions, hexafluorophosphate ions or tetrafluoroborate ions as well as preferably cations selected from the group of hydrogen ions ($H^+$), alkali or earth alkaline metal cations (e.g. lithium, sodium, potassium, magnesium, calcium), as well as the substituted or unsubstituted ammonium cations (e.g. tetrabutyl ammonium, tetramethyl ammonium, tetraethyl ammonium), wherein the substituents in general may be alkyl groups.

Preferably used are redox-active compounds comprising one to four, preferably one to two structural units of formula I or II, in which $R_1$ is a covalent C—C-bond or —O—, —NH—, arylene or heteroarylene, and especially preferred a covalent C—C-bond, phenylene, biphenylene or thiophendiyl.

Further redox-active compounds preferably used are those comprising one to four, preferably one to two structural units of formula I and/or II, preferably those of formulae Ia or IIa and most preferred those of formulae Ib, IIb, IV, V, VII. VIII, IX, IXa, X or Xa, and very most preferred those of formulae IVa, Va, VIIa, VIIb, VIIc, VIId, VIIIa, VIIIb, VIIIc, VIIId, IXa, Xa or Xb, in which b and c are zero or in which b and c are 1 or 2 and $R_2$ and $R_3$ each are methyl, ethyl, methoxy, ethoxy, trifluoromethyl, difluoromethyl, fluorine, chlorine, hydroxy, amino or nitro.

Further redox-active compounds preferably used are those of formula III, VII, VIIa, VIIb VIII, VIIIa, VIIIb, IX, IXa, IXb, X, Xa or Xb, more preferred those of formulae IIIa, IIIb, V, Via, VIIc, VIId, VIIe, VIIIc, VIIId, VIIIe, IXc or Xc, in which $R_4$, $R_5$, $R_6$ and $R_7$ each are $C_1$-$C_6$-alkyl and especially preferred represent ethyl or methyl.

Further redox-active compounds preferably used are those of formula IV, V, VII, VIIa, VIIb, VIII, VIIIa or VIIIb, preferably those of formulae IVa, Va, VIIc or VIIIc and most preferred those of formulae Ib, VIId, VIIe, VIIId or VIIIe, in which $R_8$ or $R_8$ and $R_{10}$ are hydrogen, $C_1$-$C_6$-alkyl, $C_1$-$C_6$-alkyl which is substituted with a carboxylic alkylester group, $C_1$-$C_6$-alkyl which is substituted with a carboxylic amide group, $C_1$-$C_6$-alkyl which is substituted with a carboxylic acid group, $C_1$-$C_6$-alkyl which is substituted with a sulfonic acid group or $C_1$-$C_6$-alkyl which is substituted with an amino group, and very preferably preferred represent hydrogen, ethyl or methyl.

Further redox-active compounds preferably used are those of formula IIb, in which $R_{20}$ and $R_{21}$ represent hydrogen, $C_1$-$C_6$-Alkyl, $C_1$-$C_6$-alkyl which is substituted with a carboxylic alkylester group, $C_1$-$C_6$-alkyl which is substituted with a carboxylic amide group, $C_1$-$C_6$-alkyl which is substituted with a carboxylic acid group, $C_1$-$C_6$-alkyl which is substituted with a sulfonic acid group or $C_1$-$C_6$-alkyl which is substituted with an amino group and most especially preferred represent hydrogen, ethyl or methyl or in which residues $R_{20}$ and $R_{21}$ together form a $C_1$-$C_3$-alkylene group, preferably ethylene.

Further redox-active compounds preferably used are those of formula IIIa, in which $R_{13}$ is hydrogen, $C_1$-$C_6$-alkyl, $C_1$-$C_6$-alkoxy, $C_1$-$C_6$-partial- or perfluoroalkyl, $C_1$-$C_6$-partial- or perchloroalkyl, $C_1$-$C_6$-fluorochloroalkyl, phenyl, benzyl, fluorine, chlorine, hydroxy, amino or nitro.

Further redox-active compounds preferably used are those of formula IV or V, more preferred those of formula IVa or Va, in which $R_9$ is alkylene, poly(alkyleneamino), arylene, aryltriyl, arylquaternyl, heterocyclylene, heterocyclyltriyl or heterocyclylquaternyl, most preferred represents $C_2$-$C_6$-alkylene, di-($C_2$-$C_6$-alkyleneamino), tri-($C_2$-$C_6$-alkyleneamino), quater-($C_2$-$C_6$-alkyleneamino), phenylene, phenyltriyl or phenylquaternyl.

Further redox-active compounds preferably used are those of formula VII or VIII, more preferred those of formulae VIIc or VIIIc, in which $R_{12}$ is alkylene, alkyltriyl, alkylquaternyl, alkyloxydiyl, alkyloxytriyl, alkyloxyquaternyl, arylene, aryltriyl, arylquaternyl, heterocyclylene, heterocyclyltriyl or heterocyclylquaternyl, most preferred represent $C_2$-$C_6$-alkylene, such as ethylene or propylene, or $C_2$-$C_6$-alkoxydiyl, such as 1,2-dioxyethylene or 1,3-dioxypropylene, or $C_3$-$C_6$-alkoxytriyl, such as a residue of 1,2,3-propanetriol or a residue of trimethylolpropane, or $C_4$-$C_6$-alkoxyquaternyl, such as a residue of pentaerithritol, or phenylene, phenyltriyl or phenylquaternyl.

Further redox-active compounds preferably used are those of formulae IX or X, more preferred those of formulae VIIId or VIIId, in which $R_{14}$ is alkylene, alkyleneamino, poly(alkyleneamino), arylene or heterocyclylene, more preferably $C_2$-$C_6$-alkylene, $C_2$-$C_6$-alkyleneamino or phenylene.

Further redox-active compounds preferably used are those of formulae IX or X, more preferred those of formulae IXc or Xc, in which $R_{15}$ is alkylene, alkyltriyl, alkylquaternyl, arylene, aryltriyl, arylquaternyl, heterocyclylene, heterocyclyltriyl or heterocyclylquaternyl, most preferred $C_2$-$C_6$-alkylene, such as ethylene or propylene, or phenylene, phenyltriyl or phenylquaternyl.

Further redox-active compounds preferably used are those of formula VI, in which $R_{11}$ is alkylene, alkyltriyl, alkylquaternyl, alkyloxydiyl, alkyloxytriyl, alkyloxyquaternyl, arylene, aryltriyl, arylquaternyl, heterocyclylene, heterocyclyltriyl or heterocyclylquaternyl, more preferred $C_2$-$C_6$-alkylene, such as ethylene or propylene, or $C_2$-$C_6$-alkoxydiyl, such as 1,2-dioxyethylene or 1,3-dioxypropylene, or $C_3$-$C_6$-alkoxytriyl, such as a residue of 1,2,3-propanetriol or a residue of trimethylolpropane, or $C_4$-$C_6$-alkoxyquaternyl, such as a residue of pentaerithritol, or phenylene, phenyltriyl or phenylquaternyl.

Indices b and c are preferably each 0 or independently of one another 1 or 2.

Index a is preferably 1 or 2 and more preferred 2.
Index q is preferably 1 or 2 and more preferred 1.
Index d is preferably 1 or 2 and more preferred 1.
Index g is preferably 1 or 2 and more preferred 1.
Index h is preferably 1 or 2 and more preferred 1.

Especially preferred compounds of formulae VII or VIII, more preferred those of formulae VIIa or VIIIa and most preferred those of formulae VIIc or VIIIc are used, in which index g is 1 and index h is 1 or 2 or in which index g is 1 or 2 and index h is 1.

Index i is preferably 1 or 2 and more preferred 1.
Index j is preferably 1 or 2 and more preferred 1.
Index k is preferably 1, 2 or 4 and more preferred 2 or 4.
Index f is preferably 1 or 2 and more preferred 1.
Index m is preferably 1 or 2 and more preferred 1.
Index n is preferably ½, 1 or 2 and more preferred ½ or 1.
Index l is preferably ½ or 1 and more preferred 1.
Index o is preferably 1 or 2 and more preferred 1.
Index p is preferably 6, 5, 4, 3, 5/2, 2 or 3/2 and more preferred 3 or 5.
Index r is preferably 9, 6, 9/2 or 3 and more preferred 9 or 6.
Index s is preferably 3 or 3/2 and more preferred 3.
Index t is preferably 0.
Index u is preferably 1 or 2, more preferred 1.
Index v is preferably −1 or −2 and more preferred −1.
Index x is preferably −1 or −2 and more preferred −1.
Index x1 is preferably −1 or −2 and more preferred −1.
Index zy is preferably 1 or 2 and more preferred 2.
Index z is preferably 1 or 1, 2 and more preferred 2.
Index z1 is preferably 3 or 1, 5 and more preferred 1, 5.

The iron salts used in the invention as catholyte are water-soluble iron salts in the oxidation stages II and/or III. Iron salts can have any anions, as long as these do not interfere with the water solubility of these salts.

In this disclosure water solubility of a compound will be understood as a solubility of at least 1 g of the compound in 1 litre of water at 25° C.

Examples of iron salts are combinations of Fe-III chloride with Fe-III chloride or of Fe-II sulphate with Fe-III sulphate. Besides iron salts with inorganic anions also iron salts with organic anions can be used, for example Fe-III acetate with Fe-III acetate.

The redox system used according to the invention has many advantages compared to other material systems for redox flow batteries. For example, no precious metal catalysts are needed, such as with the cell type iron/chromium, since the reaction kinetics of viologen is significantly faster compared to chromium. Furthermore, the redox-active materials (TEMPO-derivatives, iron(II/III) chloride and dimethylviologen chloride) are very well soluble in water (at room temperature more than 2 mol/L) even at a neutral pH level. This results in high storage capacities (over 53 Ah/l at 2 mol/l of active materials). In the solutions it is still possible to dispense with aggressive acid as an electrolyte, as is commonly used in the systems according to the state of the art (e.g. in vanadium systems).

The redox-active materials used according to the invention are also compatible with each other, i.e. a mixed solution can be made of TEMPO-derivatives and of viologen derivatives or of iron(II/III) chloride and of viologen derivatives and this solution can be used as anolyte as well as catholyte. This significantly reduces the problem of cross-contamination via diaphragm defects, which is a major problem for long-term stability in the other organic/partially organic redox flow systems.

In particular, the combination molecules, which carry both a TEMPO functionality and a viologen functionality linked in one molecule, significantly reduce the problem of cross-contamination via diaphragm defects. If cross-contamination occurs, the same substance is still present in anolyte and as catholyte. The combination molecules therefore simulate substances—mostly metals/metal salts, which can take at least three different redox states, as this is the case for the metal vanadium, for example.

Another advantage is that the formation of hydrogen which is harmful for system operation and system safety can be suppressed, since the viologen is able to oxidize hydrogen (C. L. Bird, A. T. Kuhn, Chem. Soc. Rev.: "Electrochemistry of the Viologens" 40, 1981, p 49-82). When hydrogen is generated during charging, this is no longer available for the battery system and therefore means an efficiency loss of the battery. Viologen derivatives can therefore also be used as redox-active additives for further redox flow battery systems. In addition, an advantage of this system is the possibility to achieve a rebalancing of the capacity by light, in which the viologen molecule is transferred into the reduced form by photo induction (T. W. Ebbesen, G. Levey, L. K. Patterson "Photoreduction of methyl viologen In aqueous neutral solution without additives" Nature, 1982 vol 298, p 545-548). This can save expensive external rebalancing cycles. The rebalancing is a step necessary in vanadium systems to adjust the same quantity of charge carriers on both the anode side and the cathode side.

The redox components are used in dissolved form; this also includes their use as dispersion.

The molecular mass of the redox-active components containing residues of formula I or II or III or of formulae I and III or II and III used in the invention may vary in wide ranges. Particularly preferred used are redox-active components containing residues of formula I or II or III or of formulae I and III or II and III, whose molar mass is less than 500 g/mol.

The viscosity of the electrolyte used according to the invention is typically in the range of 1 mPas to $10^3$ mPas, particularly preferred $10^{-2}$ to $10^2$ mPas and most preferably between 1 and 20 mPas (measured at 25° C. with a rotation viscometer, plate/plate).

The production of the redox-active components used according to the invention can be performed with standard methods of organic synthesis. These procedures are known to the skilled artisan.

Besides the redox-active components described above the redox flow cell of the invention can contain yet further elements or components which are customary for such cells.

Selected redox-active components are used in both chambers of the the redox flow cell of the invention which are separated through a ion-conducting membrane from each other and which are present in the chambers in dissolved or in dispersed form.

The electrolyte contains the redox-active components. In addition an organic solvent and/or water is used. Besides this the electrolyte can contain at least one conducting salt. In addition additives may be used. Examples of these are surfactants, viscosity modifiers, pesticides, buffers, stabilisers, catalysts, conducting additives, antifreeze agents, temperature stabilisators and/or foam breakers.

Examples of electrolyte solvents are water, alcohols (e.g. ethanol), carbonic esters (e.g. propylene carbonate), nitriles (e.g. acetonitrile), amides (e.g. dimethylform-amide, dimethylacetamide), sulfoxides (e.g. dimethylsulfoxide), ketones (e.g. acetone), lactons (e.g. gamma-butyrolactone), lactams (e.g. N-methyl-2-pyrrolidone), nitro compounds (e.g. nitromethane), ethers (e.g. tetrahydrofurane), chlorinated hydrocarbons (e.g. dichloromethane), carboxylic acids (e.g. formic acid, acetic acid), mineral acids (e.g. sulfuric acid, hydrogen halides or halogen hydroacids, respectively) and their mixtures. Preferred are water, carbonic esters (e.g. propylene carbonate), nitriles (e.g. acetonitrile) and their mixtures. Especially preferred is water.

Examples of conducting salts are salts containing anions selected from the group of halogenide ions (fluoride ion, chloride ion, bromide ion, iodide ion), hydroxide ions, anions of inorganic acids (e.g. phosphate ions, sulfate ions, nitrate ions, hexafluorophosphate ions, tetrafluoroborate ions, perchlorate ions, chlorate ions, hexafluoroantimonate ions, hexafluoroarsenate ions, cyanide ions) or anions of organic acids (e.g. acetate ions, formiate ions, trifluoroacetic acid ions, trifluoro-methanesulfonate ions, pentafluoroethanesulfonate ions, nonofluorobutane-sulfonate ions, butyrate ions, citrate ions, fumarate ions, glutarate ions, lactate ions, malate ions, malonate ions, oxalate ions, pyruvate ions, tartrate ions). Particularly preferred are chloride ions and fluoride ions, hydroxide ions, phosphate ions, sulfate ions, perchlorate ions, hexafluorophosphate ions and tetrafluoroborate ions; further cations selected from the group of hydrogen ions (H+), alkali or earth alkaline metal cations (e.g. lithium, sodium, potassium, magnesium, calcium), zink, iron as well as substituted or unsubstituted ammonium cations (e.g. tetrabutylammonium, tetramethylammonium, tetraethylammonium), wherein the substituents can generally be alkyl groups. Hydrogen ions, lithium ions, sodium ions, potassium ions, tetrabutylammonium ions and their mixtures are particularly preferred. In particular, the conducting salts: NaCl, KCl, $LiPF_6$, $LiBF_4$, $NaBF_4$, $NaPF_6$, $NaClO_4$, NaOH, KOH, $Na_3PO_4$, $K_3PO_4$, $Na_2SO_4$, $NaSO_3CF_3$, $LiSO_3CF_3$, $(CH_3)_4NOH$, n-$Bu_4NOH$, $(CH_3)_4NCl$, n-$Bu_4NCl$, $(CH_3)_4NBr$, n-$Bu_4NBr$, n-$Bu_4NPF_6$, n-$Bu_4NBF_4$, n-$Bu_4NClO_4$ and their mixtures where n-Bu stands for the n-butyl group.

Examples of electrolyte additives are surfactants which may be nonionic, anionic, cationic or amphoteric. Especially preferred are nonionic surfactants (e.g. polyalkyleneglycol ethers, fatty alcohol propoxylates, alkylglucosides, alkylpoly-glucosides, octylphenolethoxylates, nonylphenolethoxylates, saponins, phospholipids)

Further examples of electrolyte additives are buffers (e.g. carbon dioxide-bi-carbonate-buffer, carbon dioxide-silicate-buffer, acetic-acid-acetate-buffer, phosphate buffer, ammonia buffer, citric acid buffer or citrate buffer, tris (hydroxylmethyl)-aminomethane, 4-(2-hydroxyethyl)-1-piperazinethane-sulfonic acid, 4-(2-hydroxyethyl)-piperazine-1-propanesulfonic acid, 2-(N-morpholino)ethane sulfonic acid, barbital acetate buffer).

The redox-active components are selected in such a manner that the redox-active component in the catholyte has a different, preferably a higher, more positive redox potential than that of the redox-active component in the anolyte. Under redox-active component all of the redox states associated with this component or all of its reduction/oxidation stages are to be understood here. The redox-active component can take $>=2$ oxidation and/or reduction states. Should the redox-active component take >2 oxidation and/or reduction states, the redox potential of at least two oxidation and/or reduction states is insofar different that between catholyte and anolyte a potential difference can be established.

The potential difference between the redox reactions of the redox-active components in each the anolyte and the catholyte is according to the invention between greater than 0 V and 4.0 V; preferably between 0.5 and 2.5 V; especially preferred between 0.9 and 1.6 V.

The redox potential of the redox-active component can be determined by means of voltammetry, for example. This procedure is known to the skilled artisan (compare Allen J. Bard and Larry R. Faulkner, "Electrochemical Methods: Fundamentals and Applications", 2001, $2^{nd}$ edition, John Wiley & Sons; Richard G. Compton, Craig E. Banks, "Understanding Voltammetry", 2010, $2^{nd}$ edition, Imperial College Press).

The redox flow cell of the invention contains an ion-conducting membrane. This fulfills the following functions
    separation of anode and cathode space
    retention of both redox-active components
    permeability for the conducting salts of the electrolyte which serve for charge equalization, i.e. for anions and/or cations of the conducting salt or in general for the charge carriers contained in the electrolyte.

The proposed membrane, for example, a membrane permeable for ions of the conductive salt or a dialysis membrane, separates the redox-active components with comparatively low molecular weights in the two chambers.

The materials of the membrane can, depending on the particular application, consist of plastics, ceramics, glasses, metals or sheet-like textile structures. Examples of materials are organic polymers such as cellulose or modified cellulose, for example cellulose ethers or cellulose esters, polyether sulfone, polysulfone, polyvinylidene fluoride, polyesters, polyurethanes, polyamides, polypropylene, polyvinyl chloride, polyacrylonitrile, polystyrene, polyvinyl alcohol, polyphenylene oxide, polyimides, polytetrafluoroethylene and derivatives thereof, or furthermore ceramics, glasses or felts. Membranes consisting of a plurality of materials (composites) are also possible.

The membranes and the redox flow cells resulting therefrom can be used in various manifestations. Examples include flat membranes, bag filters and wrapped modules. These embodiments are known to a skilled artisan. Preference is given to using flat membranes.

The membrane used according to the invention can be supported to give better stability, e.g. by a sieve-shaped or perforated plastic material or fabric.

The thickness of the membrane used according to the invention can vary within a wide range. Typical thicknesses are in the range from 0.1 µm to 5 mm, particularly preferred between 10 µm and 200 µm.

In addition to the electroactive components, electrolytes and membranes described above, the redox flow cell according to the invention contains further components. These are
    conveyor means, such as pumps, tanks and pipes for transport and storage of redox-active components electrodes, preferably consisting of or containing graphite, graphite fleece, graphite paper, carbon-nano-tube rugs, charcoal, soot or graphene optionally current collectors, such as made from graphite or from metals The positive electrode can contain following additional materials or consist of these:

Titanium coated with noble metal or with diamond, niobium, tungsten, graphite, silicon carbide or tantalum, in particular titanium coated with platinum and/or iridium and/or ruthenium oxide, diamond or diamond doped with electrically conductive components, e.g. with boron, glass carbon (Lothar Dunsch: electrochemical reactions at glass carbon, Zeitschrift fir Chemie, 14, 12, p 463-468, December 1974, indium-tin-oxide, lead, lead silver alloy, e.g. lead silver alloy with 1% silver, tin, tin oxide, soot, spinels (such as described in EP 0042984), perowskites ($CaTiO_3$), delafossites (containing copper and/or iron oxide), antimony, bismuth, cobalt, platinum and/or platinum black, palladium and/or palladium black, manganese, polypyrrole (such as described in EP 0191726 A2, EP 0206133 A1), stainless steel, hastelloy or iron-chromium-nickel-containing alloys.

Positive electrodes containing nickel are preferably used when the electrolyte has an alkaline pH value of $>=7$-8.

For coated electrode materials, the following well-known coating methods can be used: chemical vapour deposition (CVD), physical vapour deposition (PVD), galvanic deposition, current-less deposition from a liquid solution, which contains the metal in dissolved form and a reducing agent and wherein the reducing agent effects the deposition of the desired metal to a surface.

The negative electrode may contain or consist of the following materials:

Zinc, stainless steel, hastelloy or iron-chromium-nickel-containing alloys, graphite, graphite fleece, graphite paper, carbon-nano-tube rugs, charcoal, carbon black or graphene.

Negative electrodes containing nickel are preferably used when the electrolyte has an alkaline pH value of $>=7$-8.

The redox flow cells according to the invention contain current collectors as a further optional but preferred component. These have the task of producing the best possible electrical contact between the electrode material and the external power source or current sink.

In the redox flow cells according to the invention aluminium, aluminum alloys, stainless steel, hastelloy, iron-chromium-nickel alloys, noble metal-coated titanium or tantalum, in particular titanium coated with platinum and/or iridium and/or ruthenium oxide, niobium, tantalum, hafnium, zirconium may be used as current collectors.

The following well-known coating methods can be used for the production of coated current collectors: chemical vapour deposition (CVD), physical vapour deposition (PVD), galvanic deposition, electrical deposition from a liquid solution, which contains the metal in dissolved form and a reducing agent and wherein the reducing agent causes the deposition of the desired metal on a surface.

The redox flow cell according to the invention can be used in a wide variety of areas. In the broadest sense, this can be the storage of electrical energy for mobile and stationary applications. The invention also relates to the use of the redox flow cell for these purposes.

Examples of applications are inserts as stationary storage for emergency power supply, for peak load balancing, as well as for the caching of electrical energy from renewable energy sources, in particular in the photovoltaics and wind power sectors, from gas, coal, biomass, tidal, and marine power plants and deployments in the field of electromobility, such as storage in land, air and water vehicles.

The redox flow cell according to the invention is preferably used as stationary storage for electrical energy.

The redox flow cells according to the invention can be connected in a known manner in a serial or parallel manner.

The following examples explain the invention without limiting it.

Example 1: Iron/Viologen Redox Flow Battery

Theoretical cell potential ($E^0$ is defined as the redox potential in water at 20° C. against a silver/silver chloride reference electrode):

$E^0$ $Fe^{2+}/Fe^{3+}=0.77$ V $E^0$ $MV^{2+}/MV^+=-0.43$ V

→ cell potential=1.2 V

An electrolyte solution was prepared consisting of each 1 mol/L $FeCl_2$ and 1 mol/L dimethylviologen chloride, dissolved in an electrolyte solution of 2 mol/L NaCl. The substances are available from the chemical trade. The electrolyte solution was tested in a redox flow cell having an active area of 5 $cm^2$. Charging and discharging processes were performed either static (liquid not pumped) or with pumped liquid. This resulted in energy densities of up to 120 mW/$cm^2$. The storage capacity was 25 Ah/L. Taking into consideration overvoltages a cell potential of about 1.0 V was monitored.

In FIG. 1 the OCV-curve of this cell is plotted as a function of its charging condition. The OCV-curve represents the dependency of the cell potential from the charging condition. The cell potential is measured in the "open circuit", that is to say it is a cell voltage (open-circuit voltage, short: OCV) resulting at a given charging condition without external load. The higher these voltage values are the higher is the energy content and the more efficient the system can be operated.

Figure 2:
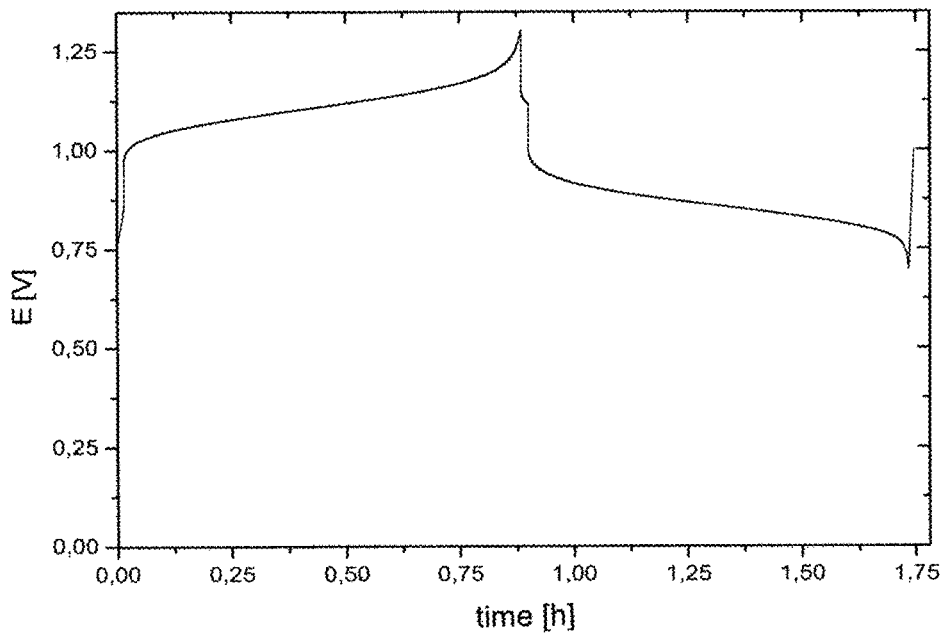
FIG. 2 is a graph showing the charging curve of the cell of FIG. 1 over time.

FIG. 2 shows the charging curve of this cell.

Example 2: TEMPO-Ammonium Chloride/Viologen Redox Flow Battery

Theoretical Cell Potential:

$E^0$ TEMPO-$N^+$/TEMPO-$N^{2+}=0.78$ V $E^0$ $MV^{2+}/MV^+=-0.43$ V

→ cell potential=1.21 V

Two electrolyte solutions were prepared: The solution for the working electrode (positive terminal of the battery) was prepared from 1.0 g TEMPO ammonium chloride having the following structure and 0.55 g NaCl in 10 ml water. The solution for the counter electrode (negative terminal of the battery) was prepared from 1.5 g dimethylviologen chloride and 0.55 g NaCl in 10 ml water. The solutions were tested in a redox flow cell with an active area of 5 $cm^2$ (in analogy to example 1). The cell was periodically charged and dechared.

Structure of TEMPO Ammonium Chloride:

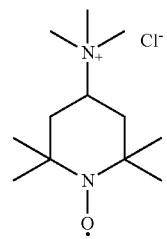

Figure 3:
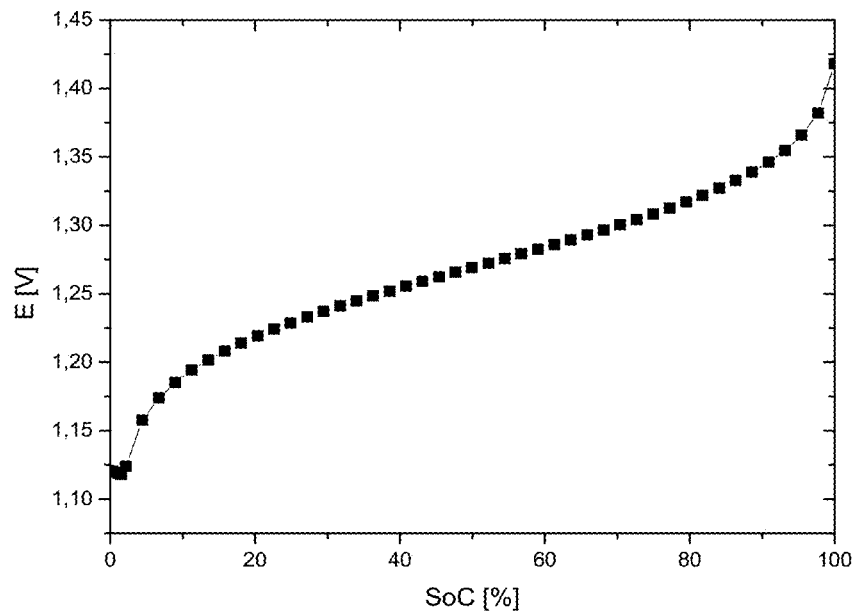
FIG. 3 is a graph showing the OCV-curve of a cell according to the invention as exemplified in Example 2, plotted as a function of its charge state.

FIG. 3 shows the OCV-curve of this cell in dependency of its charge state.

Figure 4:
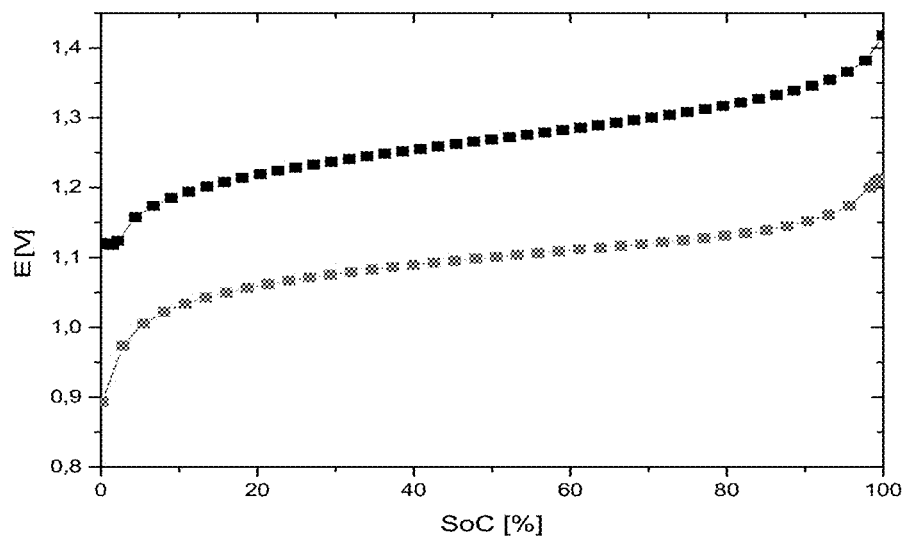
FIG. 4 is a graph comparing the OCV-curve of FIG. 3 (upper curve) with that of a polymer-based redox system (lower curve)

FIG. 4 demonstrates that the achievable potential niveau of a single cell is higher, if instead of a polymeric redox system a redox system consisting of small molecules is used. FIG. 4 shows the OCV-curve of a cell, which comprises the above-described TEMPO ammonium chloride as well as dimethylviologen with chloride as counter ion as redox-active components (upper curve). Furthermore the OCV-curve of a cell is shown which contains a TEMPO- and a viologen-based polymer as redox-active components. One realizes that the cell potential of the system with the small molecules is increased of about 0.2 V; that is to say the energy density of the system of small molecules at the same concentration is increased of more than 15%.

Example 3: Methylviologen-TEMPO Redox Flow Battery

Theoretical Cell Potential:

$E^0$ MV-TEMPO$^{2+}$/MV-TEMPO$^{3+}$=0.68 V $E^0$ MV-TEMPO$^{2+}$/MV-TEMPO$^+$=−0.46 V

→ cell potential=1.14V

An electrolyte solution was prepared from 213 mg methylviologen-TEMPO with the following structure and 235 mg NaCl in 4 ml water. The solution was used as well for the working electrode (positive terminal of the battery) as also for the counter electrode (negative terminal of the battery) and was tested in a redox flow cell with an active area of 5 cm$^2$ (in analogy to example 1, liquid was not pumped). The cell was charged and decharged in cycles. Furthermore, an OCV-curve was recorded.

Structure of Methylviologen-TEMPO:

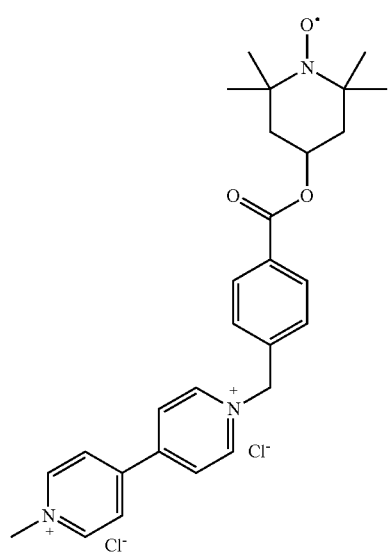

Figure 5:
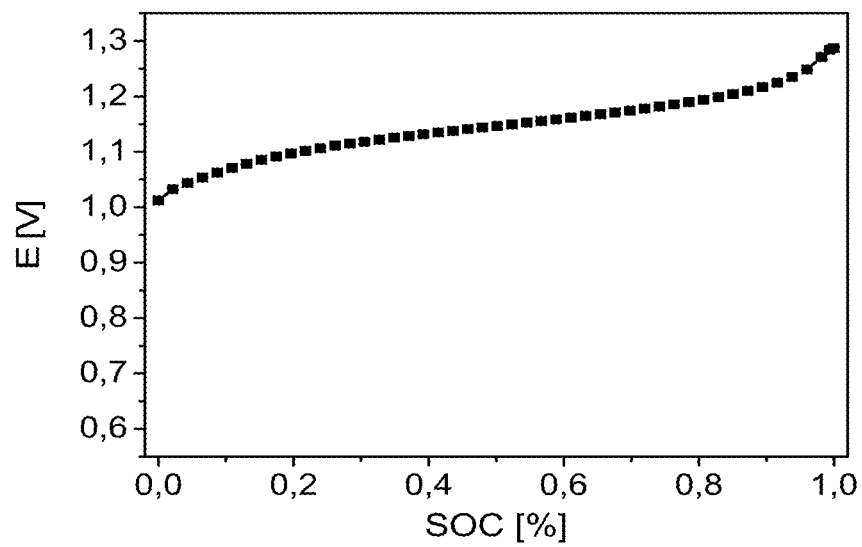
FIG. 5 is a graph showing the OCV-curve of a cell according to the invention as exemplified in Example 3, plotted as a function of charge state (SOC)

In FIG. 5 the OCV-curve of this cell is plotted in dependency from its charge state (SOC).

Figure 6:
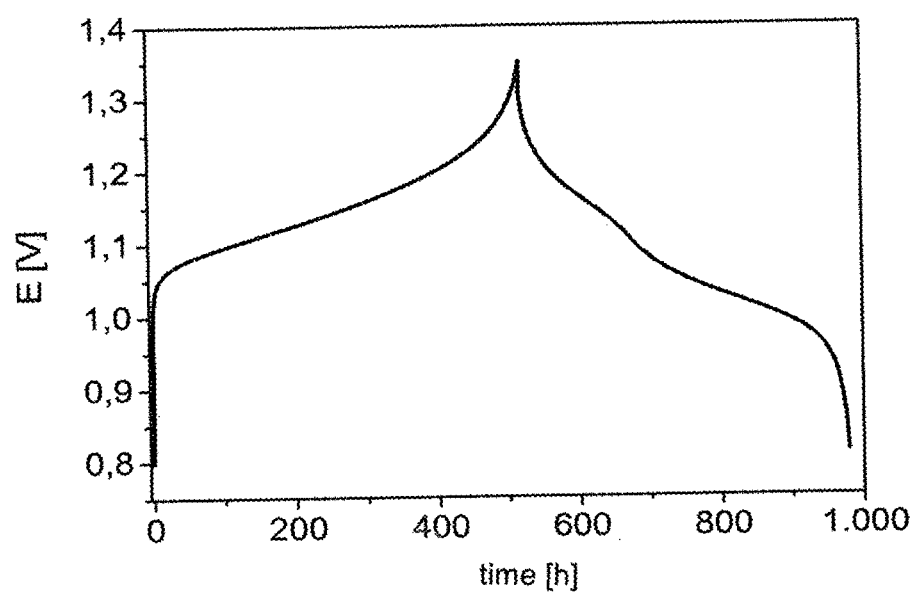
FIG. 6 is a graph showing the charging curve of the cell of FIG. 5 over time.

FIG. 6 shows the charging curve of this cell.

Example 4: Propanoate Viologen-TEMPO Redox Flow Battery

Theoretical Cell Potential:

$E^0$ MV-TEMPO$^{2+}$/MV-TEMPO$^{3+}$=0.67 V $E^0$ MV-TEMPO$^{2+}$/MV-TEMPO$^+$=−0.49 V

→ cell potential=1.16V

An electrolyte solution was prepared from 110 mg propanoate viologen-TEMPO with the following structure and 117 mg NaCl in 2 ml water. The solution was used as well as for the working electrode (positive terminal of the battery) as also for the counter electrode (negative terminal of the battery) and was tested in a redox flow cell with an active area of 5 cm$^2$ (in analogy to example 1, liquid was not pumped). The cell was charged and decharged in cycles. Furthermore an OCV-curve was registered.

Structure of Propanoate Viologen-TEMPO:

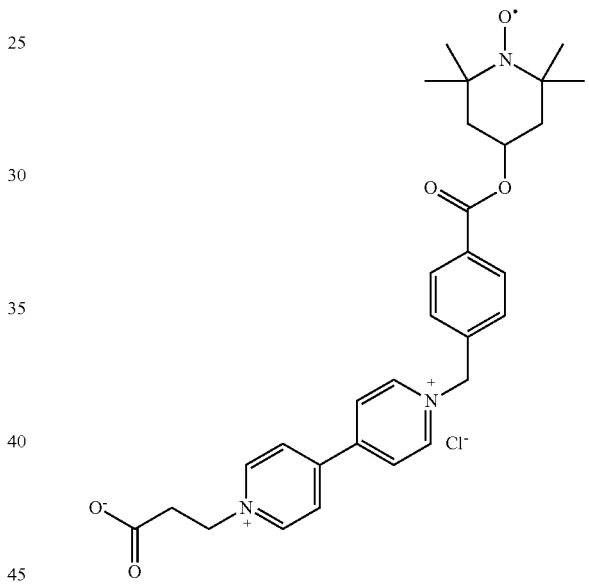

Figure 7:
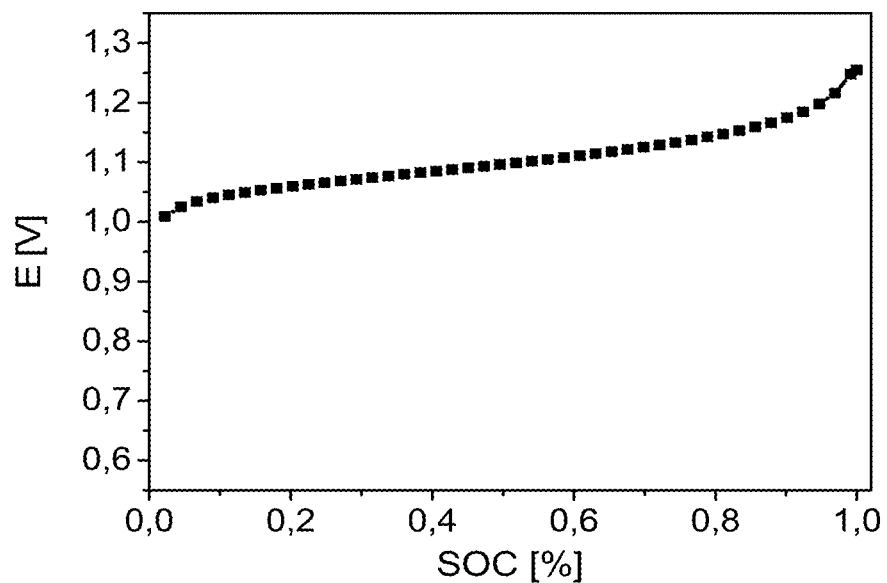
FIG. 7; is a graph showing the OCV-curve of a cell according to the invention as exemplified in Example 4, plotted as a function of charge state (SOC)

In FIG. 7 the OCV-curve of this cell is plotted in dependency from its charge state (SOC).

Figure 8:
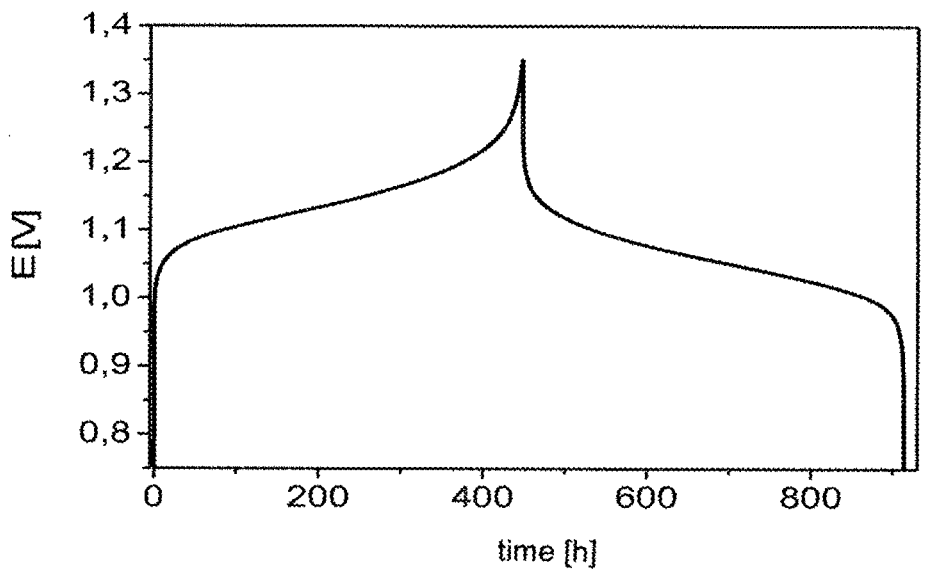
FIG. 8 is a graph showing the charging curve of the cell of FIG. 7 over time.

FIG. 8 shows the charge curve of this cell.

SYNTHESIS EXAMPLES

Example 5: Synthesis of TEMPO Ammonium Chloride

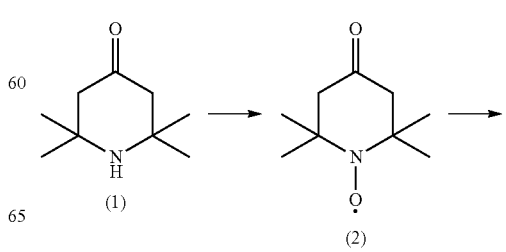

Example 6: Synthesis of Methylviologen-TEMPO

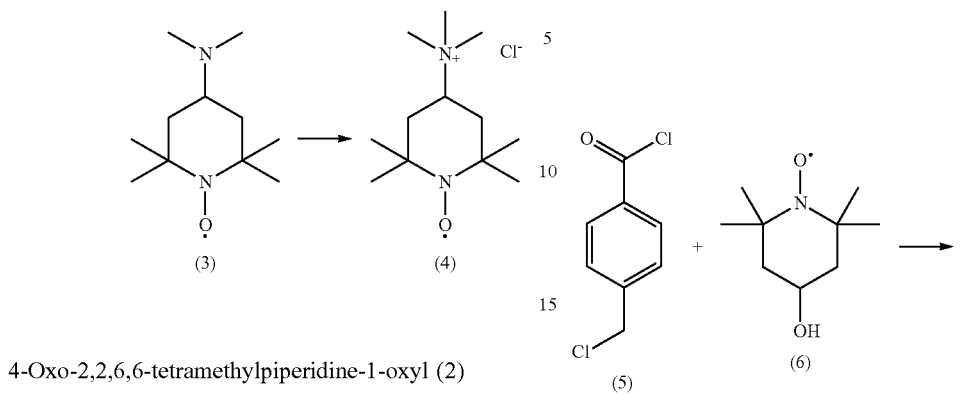

4-Oxo-2,2,6,6-tetramethylpiperidine-1-oxyl (2)

20 g of 4-Oxo-2,2,6,6-tetramethylpiperidine (1), 2 g Na₂WO₄×2 H₂O and 2 g Na₂H₂EDTA were dissolved at room temperature in 133 ml water. 26.6 ml Hydrogen peroxide (30%) were added under stirring. The progress of the reaction was monitored by means of gaschromatography (GC) and until the completion of the reaction of (1) additional 5 ml portions of hydrogen peroxide were added. From the red reaction solution a green precipitate was removed and was washed with 150 ml of water. The aqueous phase was extracted seven times with 50 ml dichloromethane and was dried over magnesium sulfate. The solvent was removed and the product was dried in the vacuum (yield 60%).

4-(Dimethylamino)-2,2,6,6-tetramethylpiperidine-1-oxyl (3)

2 g 4-Oxo-2,2,6,6-tetramethylpiperidine-N-oxyl (2) were dissolved in 20 ml of dry methanol and 7.3 g dimethylamine hydrochloride were added under inert argon atmosphere. To the reaction mixture 444 mg NaBH₃CN were added under cooling and stirring. After 48 hours it was alkalinized with caustic soda and three times extracted with 50 mL dichloromethane. The organic phase was dried over magnesium sulfate, the solvent was removed and the raw material was dried in the vacuum. The obtained raw material was used without further purification in the next step.

1-Oxyl-N,N,N-2,2,6,6-heptamethylpiperidine-4-ammonium Chloride (4, Short: TEMPO-Ammonium Chloride)

The raw material 4-(dimethylamino)-2,2,6,6-tetramethylpiperidine-1-oxyl (3) was completely dissolved in 20 ml diethylether, solids were removed by filtration and a solution of 1.42 g methyliodide in 5 ml diethylether was added. After the solution had been stirred at room temperature for 20 hours the resulting deposit was separated and washed with 20 mL of diethyl ether. The deposit was dissolved in 50 mL water and an exchange of the counter ion from iodide to chloride was performed using an ion exchanger resin (Dowex Marathon A2, chloride form). The resulting solution was freeze-dried and the product was obtained as an orange powder (yield 89%).

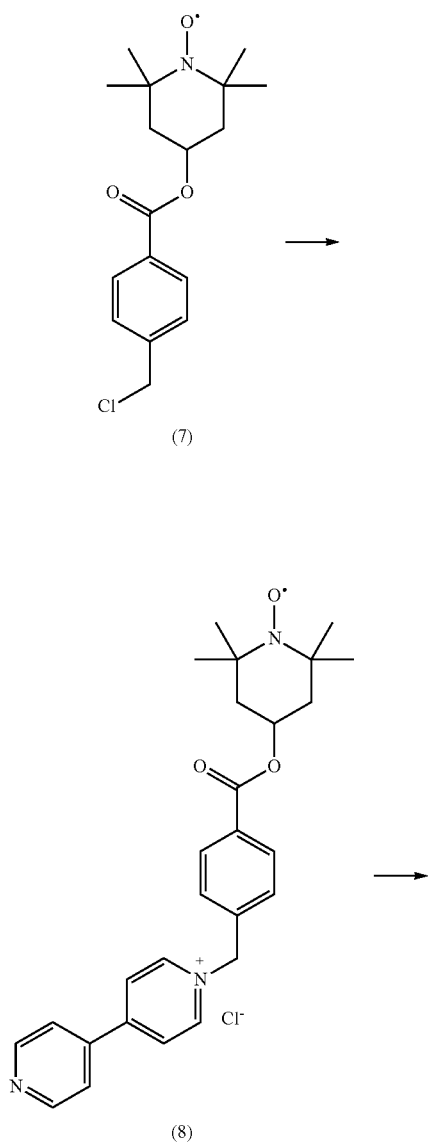

37

-continued

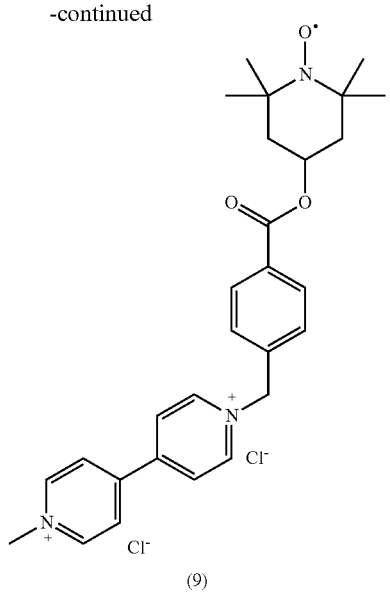

(9)

1-Oxyl-2,2,6,6-tetramethylpiperidine-4-yl-4-(chloromethyl)benzoate (7)

4.3 mL 4-(Chloromethyl)benzoylchloride (5) were added dropwise under stirring at room temperature to a solution of 5 g 4-hydroxy-2,2,6,6-tetramethylpiperidine-N-oxyl (6) in 80 mL of dry chloroform and 8 mL of dry triethylamine. After six hours the reaction mixture was added to a mixture of 300 mL of ice water and 50 ml of 5% bicarbonate solution, stirred and extracted three times with 200 ml chloroform. The organic phase was washed with 200 mL of water, dried over magnesium sulfate and the solvent was removed in the vacuum. After drying in the vacuum the raw material was obtained as orange powder (yield 95%). The obtained raw material was used in the next step without further purification.

1-(4-(((1-Oxyl-2,2,6,6-tetramethylpiperidine-4-yl)oxy)carbonyl)benzyl)-[4,4'-bipyridin]-1-ium-chloride (8)

80 mL Acetonitrile were added to 4.5 g of the raw material of 1-oxyl-2,2,6,6-tetramethylpiperidine-4-yl-4-(chloromethyl)benzoate (7) and 2.2 g 4,4'-bipyridine and the solution was stirred at 80° C. for 72 hours. The reaction mixture was precipitated in 450 mL cold ethyl acetate, the resulting deposit was separated and dried in the vacuum. The product was obtained as orange colored solid (yield 78%).

1-(4-(((1-Oxyl-2,2,6,6-tetramethylpiperidine-4-yl)oxy)carbonyl)benzyl)-1'-methyl-[4,4'-bipyridin]-1,1'-diium-chloride (9, Short: Methylviologen-TEMPO)

Variant A: In a pressure reactor chloromethane (pressure 2 bar) was added to a solution of 2 g 1-(4-(((1-oxyl-2,2,6,6-tetramethylpiperidine-4-yl)oxy)carbonyl)benzyl)-[4,4'-bipyridin]-1-ium-chloride (8) in 8 mL of water. The reaction solution was stirred at 95° C. for 35 hours and the product was obtained as solid (yield 95%) by means of freeze drying.

Variant B: 0.14 mL Methyliodide was added to a solution of 0.5 g 1-(4-(((1-oxyl-2,2,6,6-tetramethylpiperidine-4-yl)oxy)carbonyl)benzyl)-[4,4'-bipyridin]-1-ium-chloride (8) in

38

12 mL of DMSO. The reaction mixture was stirred for 6 hours at 60° C. and was subsequently precipitated in 150 mL of ethyl acetate. The deposit was dissolved in water and the ion exchange of the counter ion from iodide to chloride was performed using an ion exchanger resin (Dowex Marathon A2, chloride form). The obtained solution was freeze dried and the product was obtained as an orange powder (yield 82%).

Example 7: Synthesis of the Propanoate Viologen-TEMPO

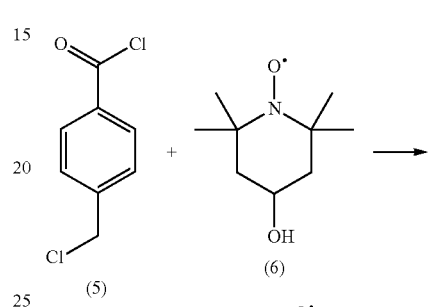

(5)       (6)

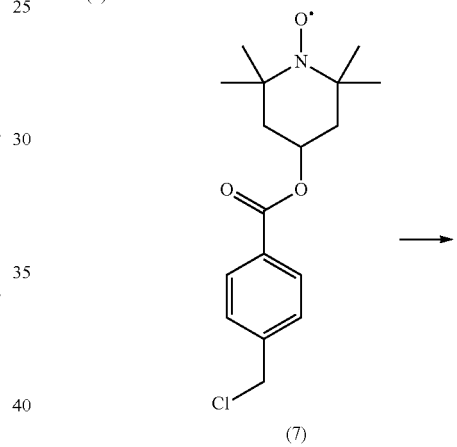

(7)

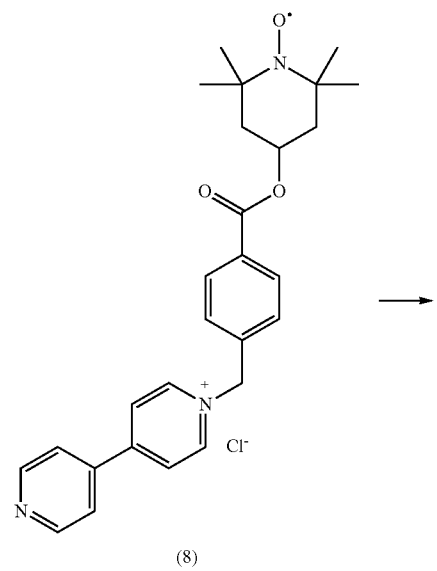

(8)

-continued

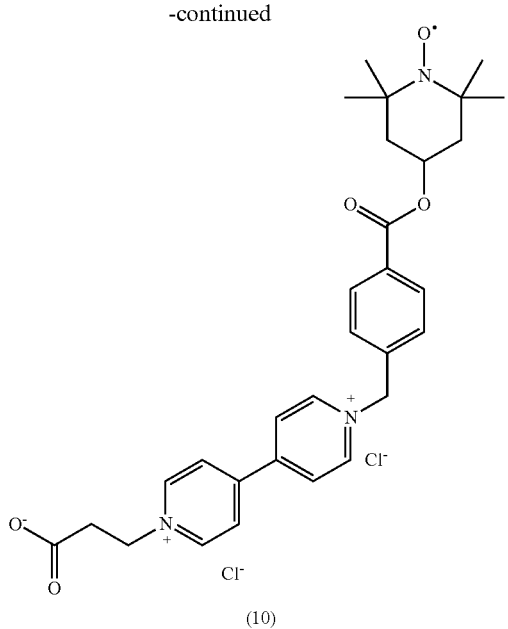

(10)

3-(1'-(4-(((1-Oxyl-2,2,6,6-tetramethylpiperidine-4-yl)oxy)carbonyl)benzyl)-[4,4'-bipyridin]-1,1'-diium-1-yl)propanoate-chloride (10, Short: Propanoate Viologen-TEMPO)

3 ml Acrylic acid were added under stirring to 2 g 1-(4-(((1-oxyl-2,2,6,6-tetramethylpiperidine-4-yl)oxy)carbonyl)benzyl)-[4,4'-bipyridin]-1-ium-chloride (8) in 10 mL of acetonitrile. The solution was stirred at 60° C. for 30 minutes, cooled and precipitated in cold ethyl acetate. The deposit was separated, dried in the vacuum and the target product was obtained as a powder (yield 56%).

Example 8: Synthesis of Multiple Functionalized Viologens

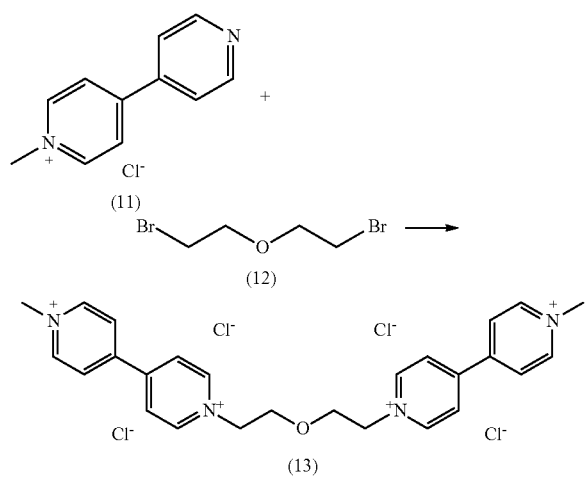

1-Methyl-[4,4'-bipyridin]-1-ium-chloride (11)

100 g 4,4'-Bipyridine in 200 mL of acetonitrile and 200 mL of toluene were submitted to a pressure reactor. After addition of 32.4 g of chloromethane the solution was stirred at 70° C. for 26 hours. The solvent was removed in the vacuum and the product was obtained as a gray powder (yield 98%).

1',1'''-(Oxybis(ethane-2,1-diyl))bis(1-methyl-[4,4'-bipyridin]-1,1'-diium)chloride (13)

61 µl 1-Bromo-2-(2-bromoethoxy)ethane (12), 18 mg tetrabutylammoniumiodide and 2 mL DMSO were added to 0.2 g 1-methyl-[4,4'-bipyridine]-1-ium-chloride (11). The reaction mixture was stirred for 3 days at 110° C., cooled and precipitated in cold ethyl acetate. The deposit was dissolved in water and an ion exchange of the counter ion from iodide to chloride was performed with an ion exchanger resin (Dowex Marathon A2, chloride form). The resulting solution was freeze dried and the product was obtained as an orange powder (yield 73%).

Analytical Data for the Target Products of Examples 5 to 8

$^1$H NMR spectra were recorded on a Bruker Fourier 300 (300 MHz). TEMPO-radicals were reduced using phenylhydrazine or hydrazine hydrate in order to avoid the presence of any paramagnetic species, which could affect the measurements.

The cyclovoltammograms were recorded with a 3-electrode setup using a glass-carbon disk-electrode as working electrode, a platinum wire as counter electrode and a silver/silver chloride electrode as reference. Aqueous sodium chloride solutions (0.1 mol/l) were used as electrolyte.

1-Oxyl-N,N,N-2,2,6,6-heptamethylpiperidine-4-aminiumchloride (4, Short: TEMPO-ammonium chloride)

$^1$H NMR (DMSO, 300 MHz) δ: 3.73 (1H, m); 3.02 (9H, s); 1.99 (2H, m); 1.55 (2H, m); 1.09 (12H, d).

Figure 9:
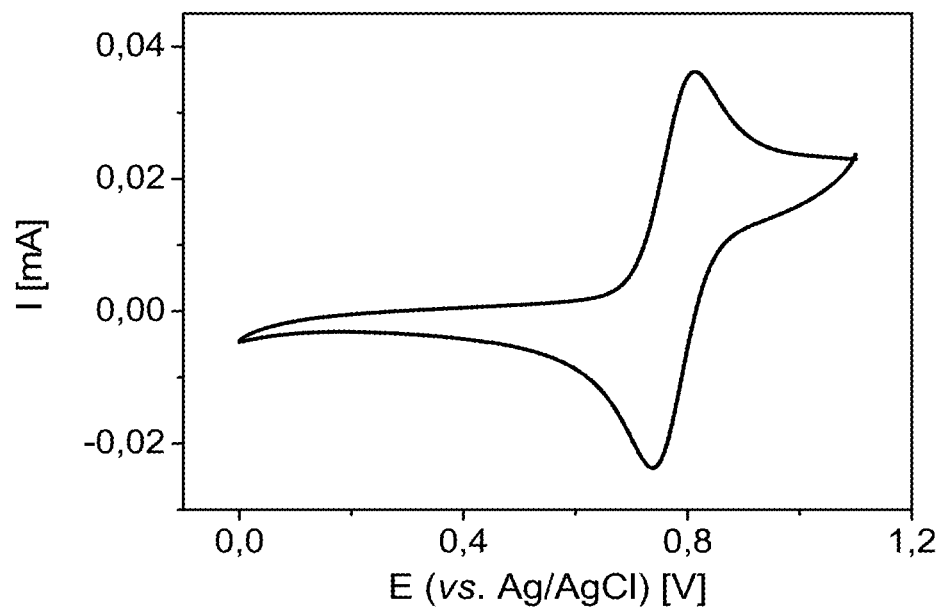
FIGS. 9-11 are cyclic voltammograms of the compounds prepared according to Examples 5, 6, and 7, respectively, in aqueous sodium chloride solution (0.1 mol/l), measured against a silver/silver chloride reference electrode.

FIG. 9 shows a cyclovoltammogramme of the compound in aqueous sodium chloride solution (0.1 mol/l), measured against a silver/silver chloride reference electrode.

1-(4-(((1-Oxyl-2,2,6,6-tetramethylpiperidine-4-yl)oxy)carbonyl)benzyl)-1'-methyl-[4,4'-bipyridine]-1,1'-diium-chloride (9, short: methylviologen-TEMPO)

$^1$H NMR (D$_2$O, 300 MHz) δ: 9.09 (2H, d); 8.94 (2H, d); 8.44 (4H, m); 8.01 (2H, d); 7.52 (2H, d); 5.93 (2H, s); 5.28 (1H, m); 4.40 (3H, s); 2.13 (2H, m); 1.82 (2H, m); 1.24 (12H, s).

Figure 10:
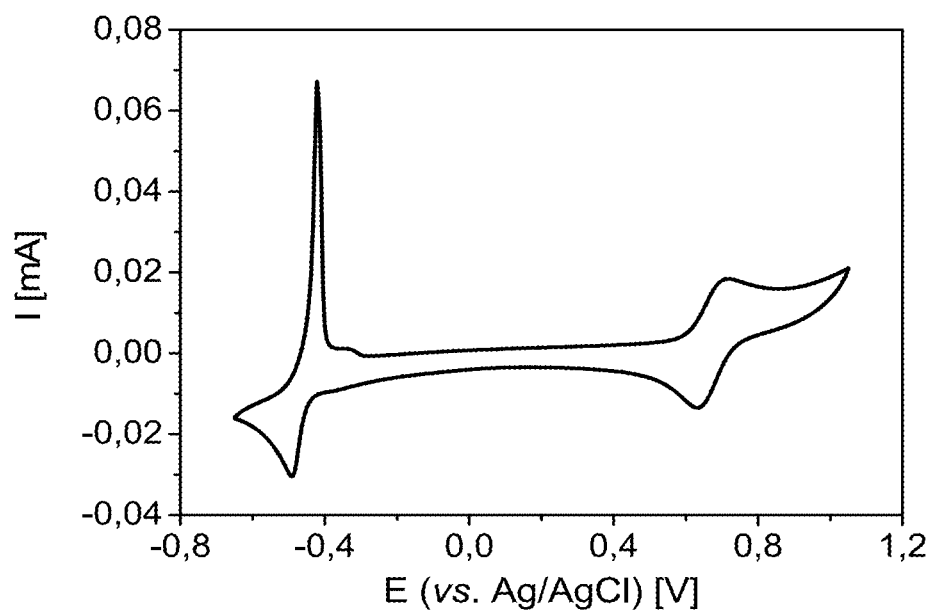

FIG. 10 shows a cyclovoltammogramme of the compound in aqueous sodium chloride solution (0.1 mol/l), measured against a silver/silver chloride reference electrode.

3-(1'-(4-(((1-Oxyl-2,2,6,6-tetramethylpiperidine-4-yl)oxy)carbonyl)benzyl)-[4,4'-bipyridin]-1,1'-diium-1-yl)propanoate-chloride (10, Short: Propanoate Viologen-TEMPO)

$^1$H NMR (D$_2$O, 300 MHz) δ: 9.05 (4H, m); 8.43 (4H, m); 8.02 (2H, d); 7.51 (2H, d); 5.92 (2H, s); 5.31 (1H, m); 4.81 (2H, t); 2.87 (2H, m); 2.16 (2H, m); 1.84 (2H, m); 1.26 (12H, d).

Figure 11:
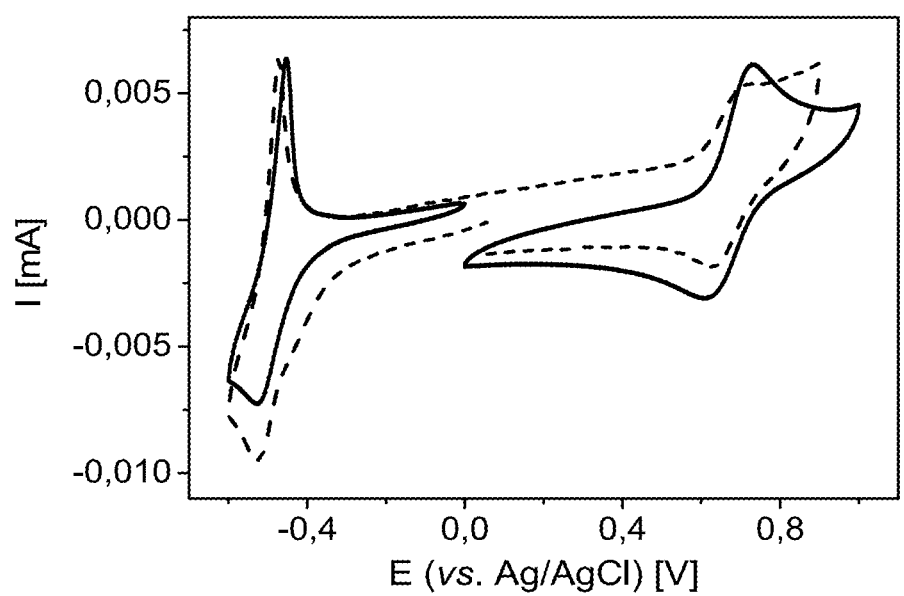

FIG. 11 shows a cyclovoltammogramme of the compound in aqueous sodium chloride solution (0.1 mol/l), measured against a silver/silver chloride reference electrode. The solid lines represent the individual measurement of the anodic or cathodic area, while the dotted line represents a measurement over the total range.

1',1'''-(Oxybis(ethane-2,1-diyl))bis(1-methyl-[4,4'-bipyridine]-1,1'-diium)chloride (13)

$^1$H NMR (DMSO, 300 MHz) δ: 9.09 (4H, m); 8.99 (4H, m); 8.50 (8H, m); 4.88 (4H, m); 4.45 (6H, s); 4.06 (4H, m).

The invention claimed is:

1. A redox flow cell for storage of electrical energy comprising a reaction cell having two electrode chambers for catholyte and anolyte, which are each connected to at least one store for liquid and are separated by an ion-conducting membrane, and which are equipped with electrodes, wherein the electrode chambers are each filled with electrolyte solutions comprising redox-active components dissolved or dispersed in an electrolyte solvent, as well as optionally conducting salts dissolved therein and optionally further additives,
wherein the anolyte comprises a redox-active component comprising one to six multi-ring structural units of formula I or formula II in an anolyte molecule,
wherein the catholyte comprises a redox-active component comprising one to six structural units of formula IIIb in a catholyte molecule

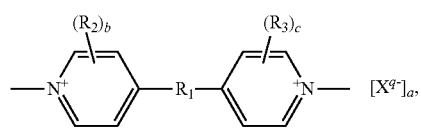
(I)

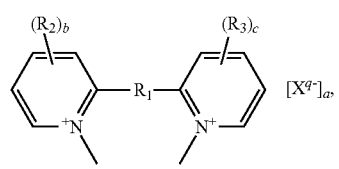
(II)

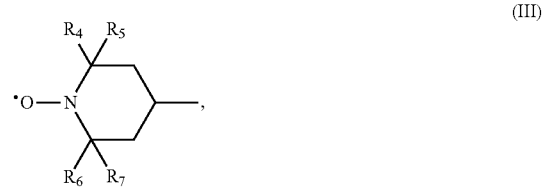
(III)

wherein
$R_4$, R, $R_6$ and $R_7$ independently of one another represent alkyl, cycloalkyl, aryl or aralkyl,
o is an integer from 1 to 4,
q is an integer from 1 to 3,
$R_{16}$ is an o-times positively charged monovalent quaternary ammonium residue, quaternary phosphonium residue ternary sulfonium residue or an o-times positively charged monovalent heterocyclic residue,
X is a q-valent inorganic or organic anion or a mixture of such anions, and
l is a number with a value o/q;
  wherein the lines going off the nitrogen atoms in the structures of formula I or formula II represent covalent bonds connecting the structure of formula I or formula II with the remainder of the anolyte molecule,
—$R_1$— is a covalent C—C-bond or a divalent bridge group,
☐O—N indicated a nitroxide radical,
$R_2$ and $R_3$ independently of one another represent alkyl, alkoxy, haloalkyl, cycloalkyl, aryl, aralkyl, heterocyclyl, halogen, hydroxy, amino, nitro or cyano,
b and c independently of one another are integers from 0 to 4; and
a is a number of value 2/q.

2. The redox flow cell according to claim 1, wherein at least one of the redox-active components comprise two to four multi-ring structural units of formula I or two to four structural units of formula IIIb.

3. The redox flow cell according to claim 1, wherein the anolyte comprises redox-active compounds of formula IV,

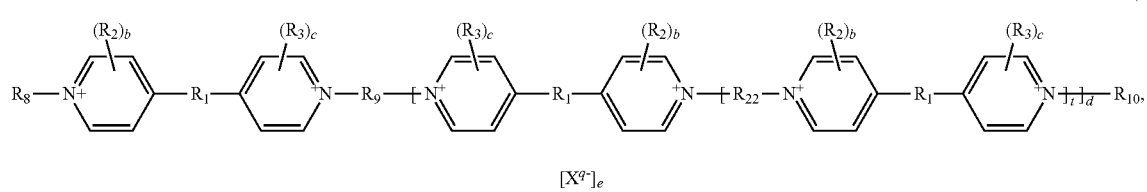
(IV)

in which $R_8$ and $R_{10}$ independently of one another represent hydrogen; alkyl that is optionally substituted with a carboxylic ester group, carboxylic amide group, carboxylic acid group, sulfonic acid group or amino group; cycloalkyl that is optionally substituted with a carboxylic ester group, carboxylic amide group, carboxylic acid group, sulfonic acid group or amino group; aryl that is optionally substituted with a carboxylic ester group, carboxylic amide group, carboxylic acid group, sulfonic acid group or amino group; aralkyl that is optionally substituted with a carboxylic ester group, carboxylic amide group, carboxylic acid group, sulfonic acid group or amino group;

- $R_9$ is alkylene, poly(alkyleneamino), arylene, aryltriyl, arylquaternyl, heterocyclylene, heterocyclyltriyl or heterocyclylquaternyl;
- $R_{22}$ is a divalent organic bridge group;
- d is an integer from 1 to 5;

t is 0 or, if $R_9$ is a divalent organic bridge group, represents 0 or 1, and e is a number having the value $(2+2d+2t)/q$.

4. A method of storing electrical energy for stationary and mobile applications comprising utilizing the redox flow cell according to claim 1.

5. The redox flow cell according to claim 1, wherein
   $R_{16}$ is a single positively charged monovalent quaternary ammonium residue, quaternary phosphonium residue, ternary sulfonium residue or a single positively charged monovalent heterocyclic residue.

6. The redox flow cell according to claim 5, wherein $R_{16}$ is a quaternary ammonium sub stituent.

7. The redox flow cell according to claim 6, wherein $R_{16}$ is a trimethyl ammonium sub stituent.

8. The redox flow cell according to claim 1, wherein the redox-active component of the anolyte comprises one multi-ring structural unit of formula I and the redox-active component of the catholyte comprises one structural unit of formula IIIb.

* * * * *